(12) United States Patent
Shimauchi et al.

(10) Patent No.: US 8,625,909 B2
(45) Date of Patent: Jan. 7, 2014

(54) IMAGE ENCODING APPARATUS AND METHOD, IMAGE DECODING APPARATUS AND METHOD, AND PROGRAM

(75) Inventors: Kazuhiro Shimauchi, Tokyo (JP); Yuji Wada, Tokyo (JP); Hiroshi Ikeda, Kanagawa (JP); Daisuke Tahara, Chiba (JP)

(73) Assignee: Sony Corporation, Tokyo (JP)

( * ) Notice: Subject to any disclaimer, the term of this patent is extended or adjusted under 35 U.S.C. 154(b) by 259 days.

(21) Appl. No.: 13/019,699

(22) Filed: Feb. 2, 2011

(65) Prior Publication Data
US 2011/0229047 A1  Sep. 22, 2011

(30) Foreign Application Priority Data

Mar. 16, 2010 (JP) .................................. 2010-059117
Nov. 4, 2010 (JP) .................................. 2010-247587

(51) Int. Cl.
*G06K 9/36* (2006.01)

(52) U.S. Cl.
USPC ........................................................ 382/232

(58) Field of Classification Search
USPC ................................................. 382/232–253
See application file for complete search history.

(56) References Cited

U.S. PATENT DOCUMENTS

| | | | | |
|---|---|---|---|---|
| 6,263,109 | B1 * | 7/2001 | Ordentlich et al. | 382/232 |
| 6,510,247 | B1 * | 1/2003 | Ordentlich et al. | 382/232 |
| 6,804,402 | B2 * | 10/2004 | Andrew | 382/240 |
| 7,031,531 | B1 * | 4/2006 | Saiga et al. | 382/232 |
| 2002/0051560 | A1 * | 5/2002 | Donescu et al. | 382/100 |
| 2002/0081036 | A1 * | 6/2002 | Okada | 382/243 |
| 2004/0146209 | A1 * | 7/2004 | Kadowaki et al. | 382/233 |
| 2004/0252897 | A1 * | 12/2004 | Hara et al. | 382/239 |
| 2006/0008162 | A1 * | 1/2006 | Chen et al. | 382/239 |

FOREIGN PATENT DOCUMENTS

JP 3918263 2/2007

OTHER PUBLICATIONS

U.S. Appl. No. 13/442,199, filed Apr. 9, 2012, Wada.
David S. Taubman et al., "Image Compression Fundamentals, Standards and Practice", JPEG 2000, 7 pages.

* cited by examiner

*Primary Examiner* — Alex Liew
(74) *Attorney, Agent, or Firm* — Oblon, Spivak, McClelland, Maier & Neustadt, L.L.P.

(57) ABSTRACT

An image encoding apparatus includes a band division unit configured to perform frequency band division for generating coefficient data of each of a plurality of frequency bands from image data of a block unit and, with regard to the frequency band division, to perform frequency band division of the coefficient data of the low-band component after rearranging a spatial position with respect to coefficient data of a low-band component obtained by frequency band division, and an encoding unit configured to perform encoding of the coefficient data of each of the plurality of frequency bands.

20 Claims, 41 Drawing Sheets

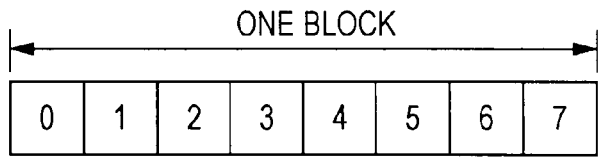
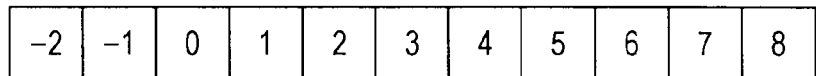
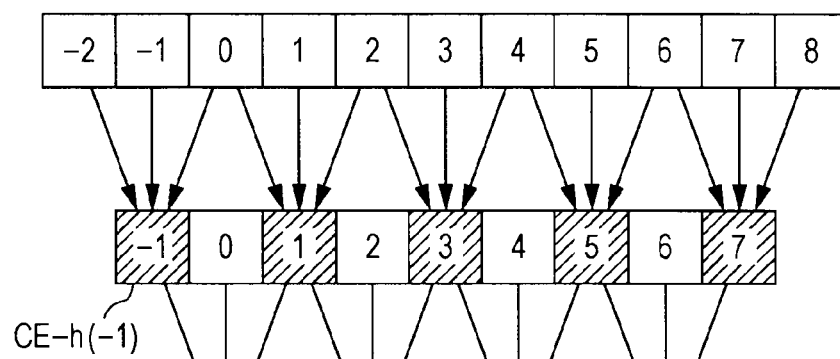
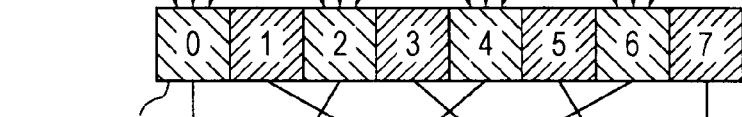
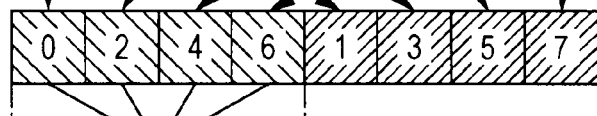
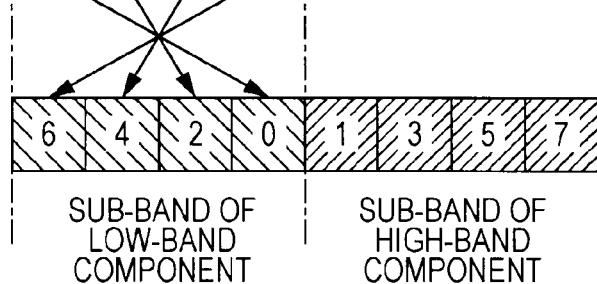
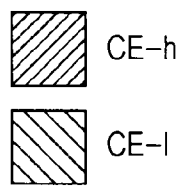

FIG. 9A

| 3LL | 3HL | 2HL | 1HL |
|-----|-----|-----|-----|
| 3LH | 3HH |     |     |
| 2LH | 2HH |     |     |
| 1LH | | | 1HH |

FIG. 9B

| 3LL | 3LL | 2HL | 1HL |
|-----|-----|-----|-----|
| 1LH | | | 1HH |

FIG. 11

| SUB-BAND (CONTEXT) | | INDEX IDXzbp OF ZBP (ENCODING TARGET) | | | | |
|---|---|---|---|---|---|---|
| | | 0 | 1 | 2 | ... | 9 |
| | 3L | SYMBOL 00 | SYMBOL 01 | SYMBOL 02 | ... | SYMBOL 09 |
| | 3H | SYMBOL 10 | SYMBOL 11 | SYMBOL 12 | ... | SYMBOL 19 |
| | 2H | SYMBOL 20 | SYMBOL 21 | SYMBOL 22 | ... | SYMBOL 29 |
| | 1H | SYMBOL 30 | SYMBOL 31 | SYMBOL 32 | ... | SYMBOL 39 |

FIG. 14

| SUBBAND (CONTEXT) | INDEX IDXtp OF TP (ENCODING TARGET) | | | | |
|---|---|---|---|---|---|
| | 0 | 1 | 2 | ... | 8 |
| 3L | SYMBOL 00 | SYMBOL 01 | SYMBOL 02 | ......... | SYMBOL 08 |
| 3H | SYMBOL 10 | SYMBOL 11 | SYMBOL 12 | ......... | SYMBOL 18 |
| 2H | SYMBOL 20 | SYMBOL 21 | SYMBOL 22 | ......... | SYMBOL 28 |
| 1H | SYMBOL 30 | SYMBOL 31 | SYMBOL 32 | ......... | SYMBOL 38 |

FIG. 17

| IDXbp | 3L | | SB_flag | |
|---|---|---|---|---|
| 0 | 0 | 0 | → 0 | 0 |
| 1 | 0 | 0 | → 0 | 0 |
| 2 | 1 | 0 | → 0 | 0 |
| 3 | 0 | 0 | → 1 | 0 |
| 4 | 0 | 0 | → 1 | 0 |
| 5 | 1 | 1 | → 1 | 0 |
| 6 | 0 | 0 | → 1 | 1 |
| 7 | 1 | 0 | → 1 | 1 |
| 8 | 0 | 1 | → 1 | 1 |
| | 74 | 9 | | |

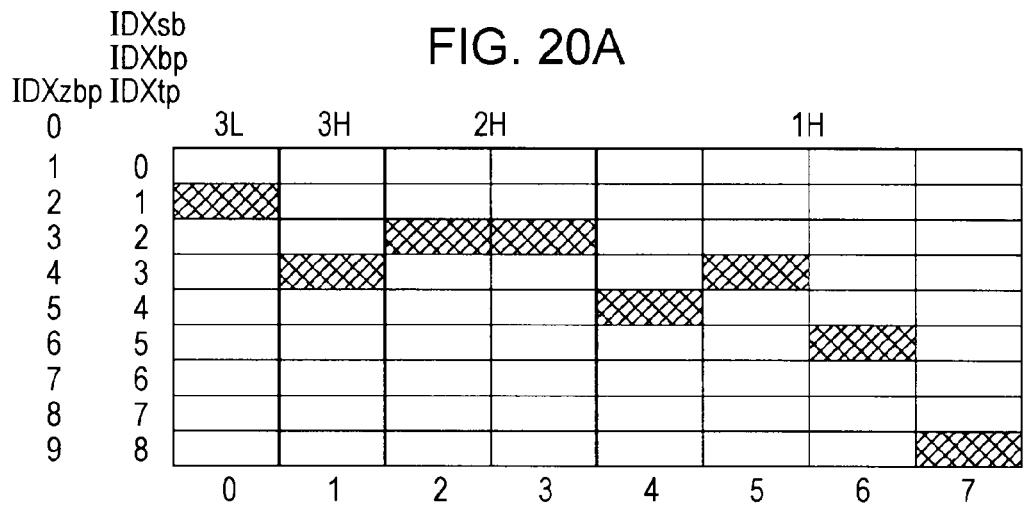
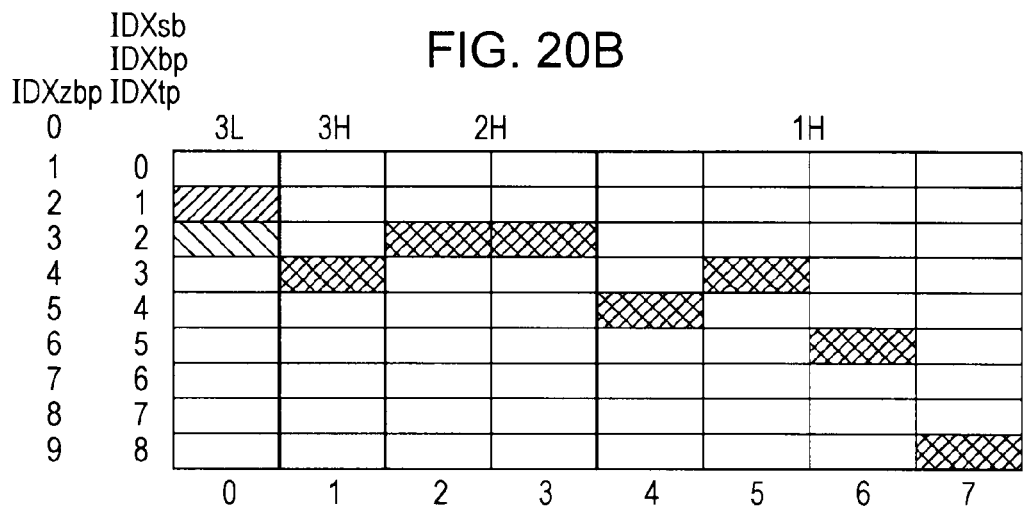
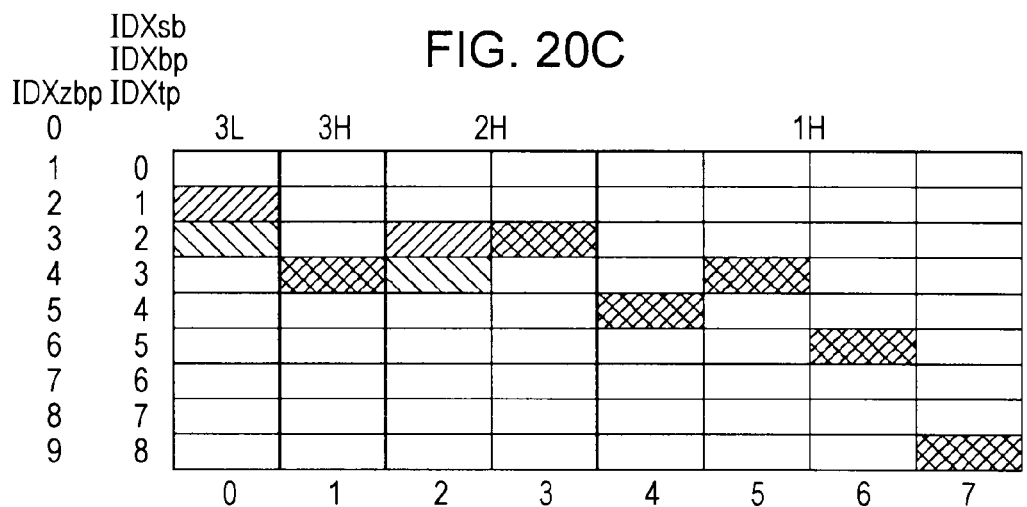

FIG. 30

| ESTIMATED DATA | INDEX IDXtp (CONTEXT) OF TP | | | |
|---|---|---|---|---|
| | 0 | 1 | 2 | ...... | 8 |
| | X0 | X1 | X2 | ...... | X8 |

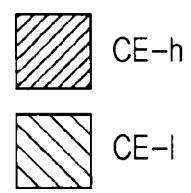

| ORTHOGONAL TRANSFORM VALUE | -9 | -8 | -7 | ……… | 9 |
|---|---|---|---|---|---|
| INDEX IDXtzbp | 0 | 1 | 2 | ……… | 18 |

FIG. 38

| SUB-BAND (CONTEXT) | INDEX IDXtzbp (ENCODING TARGET) OF ORTHOGONAL TRANSFORMED ZBP | | | | |
|---|---|---|---|---|---|
| | | 0 | 1 | 2 | ...... | 18 |
| 3L | SYMBOL 00 | SYMBOL 01 | SYMBOL 02 | ...... | SYMBOL 018 |
| 3H | SYMBOL 10 | SYMBOL 11 | SYMBOL 12 | ...... | SYMBOL 118 |
| 2H | SYMBOL 20 | SYMBOL 21 | SYMBOL 22 | ...... | SYMBOL 218 |
| 1H | SYMBOL 30 | SYMBOL 31 | SYMBOL 32 | ...... | SYMBOL 318 |

IMAGE ENCODING APPARATUS AND METHOD, IMAGE DECODING APPARATUS AND METHOD, AND PROGRAM

BACKGROUND OF THE INVENTION

1. Field of the Invention

The present invention relates to an image encoding apparatus and method, an image decoding apparatus and method, and a program, which are able to reduce block distortion and increase encoding efficiency.

2. Description of the Related Art

In recent years, due to trends toward higher resolutions or higher frame rates of image data, it is increasingly difficult to handle numerous data using limited resources within a unit of time, in an image processing system. For example, as shown in FIG. 1, in a case where a memory 85 is used in a procedure to perform image processing using an image processing system 80, since a high-capacity memory and a wide bus bandwidth necessary for data transmission to be secured, it is difficult to miniaturize the system and to reduce costs. For example, in Japanese Patent No. 3918263, as shown in FIG. 2, an image encoding unit 81 is provided between the image processing system 80 and the memory 85 and image data is encoded before being stored in the memory so as to reduce the amount of data. In addition, an image decoding unit 82 is provided between the image processing system 80 and the memory 85 and encoded data stored in the memory 85 is decoded when being read out such that image data is obtained.

In Japanese Patent No. 3918263, differential pulse code modulation (hereinafter, referred to as DPCM) with relatively low throughput is used in an encoding method upon memory storage. For example, in data corresponding to 5 pixels (40 bits), in which one pixel has 8 bits, a first pixel is set to 8 bits and each of the second to fifth pixels is set to 6 bits by obtaining the difference between neighboring pixels and performing quantization. Accordingly, after DPCM, 32 bits are obtained by 5 pixels, thereby realizing ⅘ compression. In addition, in Japanese Patent No. 3918263, by realizing a DPCM unit by a small block unit or a bus transmission unit, it is possible to realize random access and to reduce memory capacity and bus bandwidth while maintaining the original memory access efficiency of the image processing system.

SUMMARY OF THE INVENTION

However, since the encoding method described in Japanese Patent No. 3918263 is a simple DPCM, it is easy to maintain memory access efficiency. However, the image data read out from the memory and decoded may deteriorate greatly.

In a general image encoding method of the related art, there is a method with higher encoding efficiency (for example, H.264/AVC (Advanced Video Coding) or JPEG (Joint Photographic Experts Group) 2000). However, in such an image encoding method, it is difficult to efficiently perform encoding under conditions such as a simple small block unit or bus transmission unit as described above.

In the general image encoding method of the related art, from the viewpoint of encoding efficiency, since variable-length encoding is frequently used compared with fixed-length encoding, a desired bit length may not be obtained as the DPCM described in Japanese Patent No. 3918263. Accordingly, encoding is performed so as to obtain a predetermined bit length or less and the remaining bits are padded with invalid bits so as to suit a bus transmission unit. However, in a small bus transmission unit, including such invalid bits is not efficient.

In the general image encoding method of the related art, if an image is encoded in a state of being divided into blocks, block distortion may occur on a boundary between blocks. In order to reduce this block distortion, a deblocking filter is generally used in decoding, but the block distortion upon encoding is not lessened.

It is desirable to provide an image encoding apparatus and an image encoding method capable of obtaining a decoded image with low block distortion even when image encoding is performed in block units, an image decoding apparatus and an image decoding method capable of decoding an encoded image, and a program.

According to an embodiment of the invention, there is provided an image encoding apparatus including: a band division unit configured to perform frequency band division for generating coefficient data of each of a plurality of frequency bands from image data of a block unit and, with regard to the frequency band division, to perform frequency band division of the coefficient data of the low-band component after rearranging a spatial position with respect to coefficient data of a low-band component obtained by frequency band division; and an encoding unit configured to perform encoding of the coefficient data of each of the plurality of frequency bands.

In the invention, frequency band division of image data of a block unit is performed. In the frequency band division, after rearranging a spatial position with respect to coefficient data of a low-band component obtained by frequency band division, frequency band division of the coefficient data of the low-band component is performed, and the coefficient data of each of the plurality of frequency bands is generated. In the frequency band division, for example, a lifting operation and deinterleaving are performed. In the lifting operation, extension of image data is performed in an end of a block, and coefficient data is generated using the extended image data. The coefficient data generated by the lifting operation is divided for each frequency band by deinterleaving. In the coefficient data of the low-band component, rearrangement of the spatial position is performed such that the position of the coefficient data generated using the extended image data is moved. For example, the position of the coefficient data is inverted. The coefficient data is divided as the sub-block for each predetermined number and a variation in distortion amount of an image when the bit plane of the coefficient data is truncated for each sub-block is estimated. Weighting is performed with respect to the estimation result such that a sub-block located on an end of the block is not easily truncated compared with a sub-block of another position. Based on the estimation result after weighting, truncation is performed such that an image distortion amount is low and a code amount is within a target code amount and encoding is performed.

According to another embodiment of the invention, there is provided an image encoding method including the steps of: performing frequency band division for generating coefficient data of each of a plurality of frequency bands from image data of a block unit and, with regard to the frequency band division, performing frequency band division of the coefficient data of the low-band component after rearranging a spatial position with respect to coefficient data of a low-band component obtained by frequency band division, in a band division unit; and performing encoding of the coefficient data of each of the plurality of frequency bands, in an encoding unit.

According to another embodiment of the invention, there is provided a program for, on a computer, executing a process including the steps of: performing frequency band division for generating coefficient data of each of a plurality of frequency bands from image data of a block unit and, with regard to the frequency band division, performing frequency band division of the coefficient data of the low-band component after rearranging a spatial position with respect to coefficient data of a low-band component obtained by frequency band division; and performing encoding of the coefficient data of each of the plurality of frequency bands.

According to another embodiment of the invention, there is provided an image encoding apparatus including: a band division unit configured to perform frequency band division of image data of a block unit and to generate coefficient data of each of a plurality of frequency bands; an encoding unit configured to perform encoding of the coefficient data of each of the plurality of frequency bands; a distortion characteristic estimation unit configured to estimate a variation in distortion amount of an image when a bit plane of the coefficient data is truncated and to perform weighting with respect to the estimation result, for each sub-block obtained by dividing the coefficient data for each predetermined number; and a truncation unit configured to detect a truncation position in which image distortion is low and a code amount is within a target code amount based on the weighted estimation result and to perform truncation of the bit plane.

According to another embodiment of the invention, there is provided an image encoding method including the steps of: performing frequency band division of image data of a block unit and generating coefficient data of each of a plurality of frequency bands, in a band division unit; performing encoding of the coefficient data of each of the plurality of frequency bands, in an encoding unit; estimating a variation in distortion amount of an image when a bit plane of the coefficient data is truncated and performing weighting with respect to the estimation result, for each sub-block obtained by dividing the coefficient data for each predetermined number, in a distortion characteristic estimation unit; and detecting a truncation position in which image distortion is low and a code amount is within a target code amount based on the weighted estimation result and performing truncation of the bit plane, in a truncation unit.

According to another embodiment of the invention, there is provided a program for, on a computer, executing a process including the steps of: performing frequency band division of image data of a block unit and generating coefficient data of each of a plurality of frequency bands; performing encoding the coefficient data of each of the plurality of frequency bands; estimating a variation in distortion amount of an image when a bit plane of the coefficient data is truncated and performing weighting with respect to the estimation result, for each sub-block obtained by dividing the coefficient data for each predetermined number; and detecting a truncation position in which image distortion is low and a code amount is within a target code amount based on the weighted estimation result and performing truncation of the bit plane.

According to another embodiment of the invention, there is provided an image decoding apparatus including: a decoding unit configured to decode an encoded data in which coefficient data obtained by performing frequency band division of image data of a block unit is encoded; and a band synthesis unit configured to perform frequency band synthesis of the coefficient data of each of a plurality of frequency bands and to generate image data of a block unit, after returning the coefficient data obtained by the decoding to an order before rearrangement.

According to another embodiment of the invention, there is an image decoding method including the step of: decoding an encoded data in which coefficient data obtained by performing frequency band division of image data of a block unit is encoded, in a decoding unit; and performing frequency band synthesis of the coefficient data of each of a plurality of frequency bands and generating image data of a block unit, after returning the coefficient data obtained by the decoding to an order before rearrangement, in a band synthesis unit.

According to another embodiment of the invention, there is a program for, on a computer, executing a process including the steps of: decoding an encoded data in which coefficient data obtained by performing frequency band division of image data of a block unit is encoded; and performing frequency band synthesis of the coefficient data of each of a plurality of frequency bands and generating image data of a block unit, after returning the coefficient data obtained by the decoding to an order before rearrangement.

The program of the invention is a program which may be provided to, for example, a general-purpose computer system for executing various program codes by a storage medium provided in a computer readable format or a communication medium, for example, a storage medium such as an optical disc, a magnetic disk and a semiconductor memory or a communication medium such as a network. By providing such a program in a computer readable format, a process according to a program on a computer system is realized.

According to the invention, in frequency band division for generating coefficient data of each of a plurality of frequency bands from image data of a block unit, the spatial position is rearranged with respect to the coefficient data of the low-band component obtained by frequency band division and frequency band division of the coefficient data of the low-band component is performed. In addition, encoding of the generated coefficient data of each of the plurality of frequency bands is performed. To this end, even when image data is extended in the end of the block so as to repeat frequency band division, the position of the coefficient data of the low-band component generated using the extended image data is not fixed. Accordingly, influence of deterioration of band division precision is not repeatedly applied due to the use of the extended image data. Even when image encoding is performed in block units, a decoded image with low block distortion may be obtained.

BRIEF DESCRIPTION OF THE DRAWINGS

FIGS. 7A to 7F are diagrams illustrating an operation of a band division unit when a 5×3 lifting configuration is used;

FIGS. 9A and 9B are diagrams showing two-dimensional band division;

FIG. 11 is a diagram showing a transform table of Zero Bit Plane (ZBP);

FIG. 14 is a diagram showing a transform table of Truncation Point (TP);

FIG. 17 is a diagram illustrating Significant Bit (SB) flag;

FIGS. 20A to 20C are (first) diagrams illustrating an operation of a truncation unit;

FIG. 30 is a diagram showing estimation data;

FIG. 37 is a transform table showing a relationship among a ZBP orthogonal transform result DTtzbp, an index IDXtzbp and a symbol;

FIG. 38 is a transform table showing a relationship among a context, an index IDXtzbp and a symbol;

FIGS. 41A to 41D are diagrams showing a transform process of inverse Haar transform;

DESCRIPTION OF THE PREFERRED EMBODIMENTS

Hereinafter, embodiments for carrying out the invention will be described. If image data includes a plurality of component signals (for example, image data is an RGB signal, a YUV signal or the like), encoding or decoding is performed for each component signal. However, in order to simplify description, only encoding and decoding of one component signal will be described. Description will be given in the following order:

1. Configuration and Operation of Image Processing Apparatus
2. First Embodiment
3. Second Embodiment
4. Third Embodiment
5. Fourth Embodiment
6. Case where Encoding and Decoding are performed by Computer

1. Configuration and Operation of Image Processing Apparatus

Figure 1:
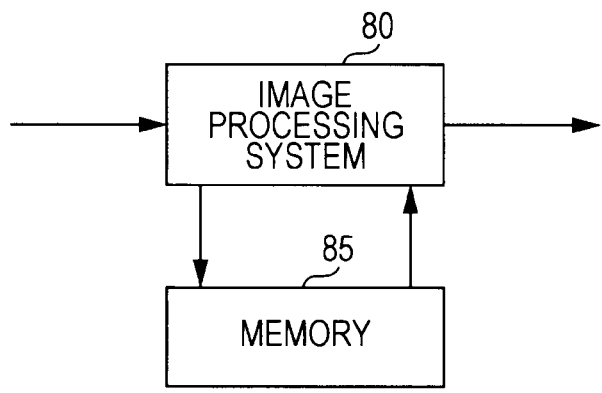
FIG. 1 is a diagram illustrating an image processing system of the related art.
Figure 2:
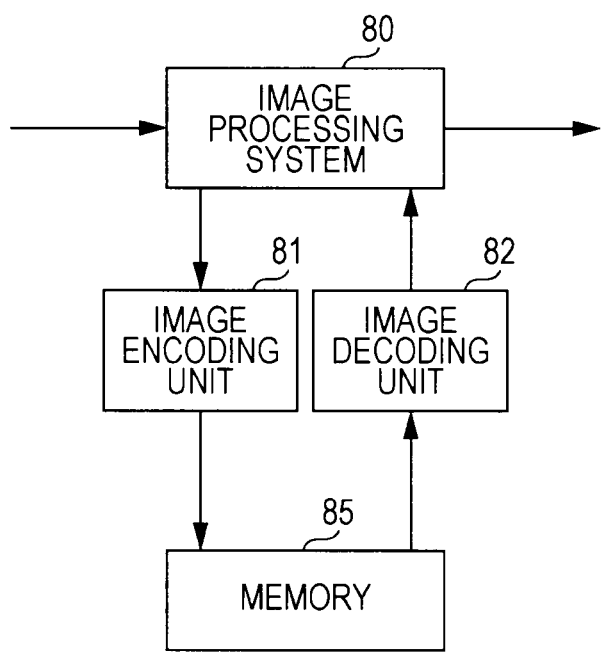
FIG. 2 is a diagram illustrating another image processing system of the related art.
Figure 3:
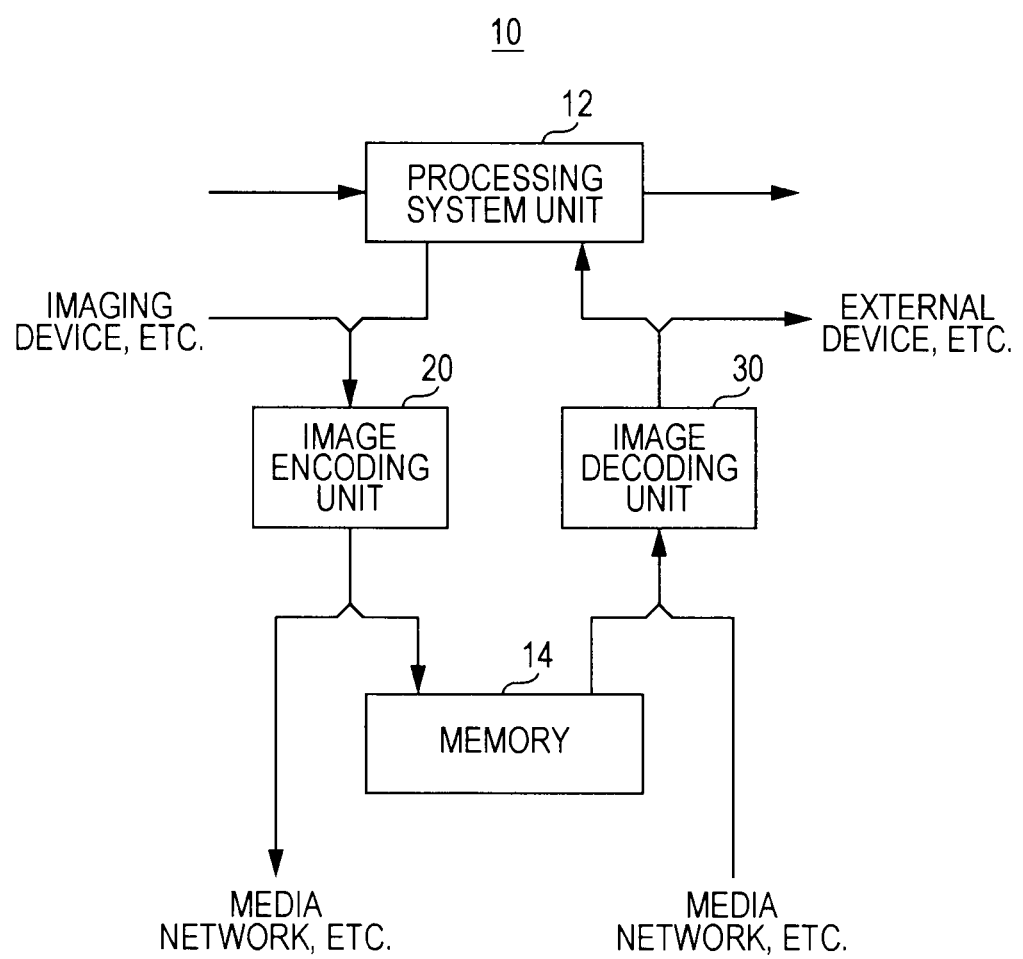
FIG. 3 is a diagram showing the configuration of an image processing apparatus.

FIG. 3 is a diagram showing the configuration of an image processing apparatus 10. The image processing apparatus 10 includes an image encoding unit 20 and an image decoding unit 30. The image encoding unit 20 has a function for encoding image data output from an imaging device, an image processing system unit 12 or the like in block units of M×N pixels and outputting encoded data. The encoded data is, for example, transmitted to the image decoding unit 30 through a medium 14 such as a memory or a hard disk or a network. The image decoding unit 30 performs decoding of the encoded data and outputs image data of block units of M×N pixels.

Figure 4:
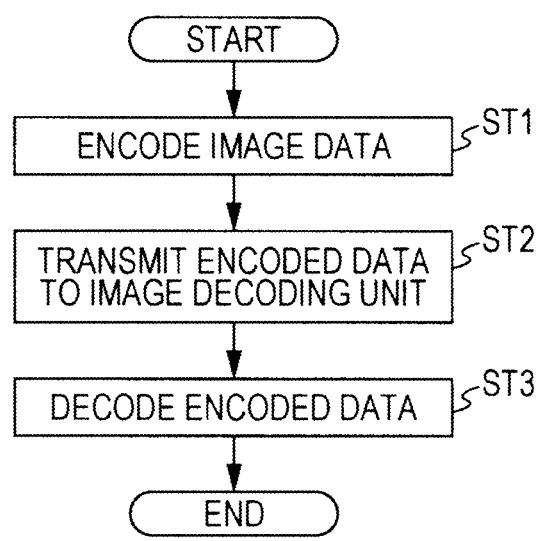
FIG. 4 is a flowchart illustrating an operation of an image processing apparatus.

FIG. 4 is a flowchart illustrating an operation of the image processing apparatus 10. In step ST1, the image encoding unit 20 performs encoding of image data. The image encoding unit 20 encodes the image data in block units of M×N pixels, generates encoded data, and progresses to step ST2. In step ST2, the image encoding unit 20 sends the encoded data to the image decoding unit 30 through a memory, a medium or a network. In step ST3, the image decoding unit 30 performs decoding of encoded data. The image decoding unit 30 performs decoding of the transmitted encoded data and obtains image data of block units of M×N pixels.

The image encoding unit 20 performs encoding of image data in block units of M×N pixels. In addition, the image decoding unit 30 performs decoding of the encoded data generated by the image encoding unit 20 and obtains the image data of block units of M×N pixels. In this way, it is possible to perform processing in block units and to easily perform random access or the like. Since encoding or decoding necessary not be performed with respect to a block of an unnecessary image part, it is possible to reduce memory capacity and bus bandwidth while maintaining memory access efficiency.

The image encoding unit 20 performs encoding of image data such that block distortion is lessened even when encoding of image data is performed in block units.

2. First Embodiment

[2-1. Configuration of Image Encoding Unit of First Embodiment]

Figure 5:
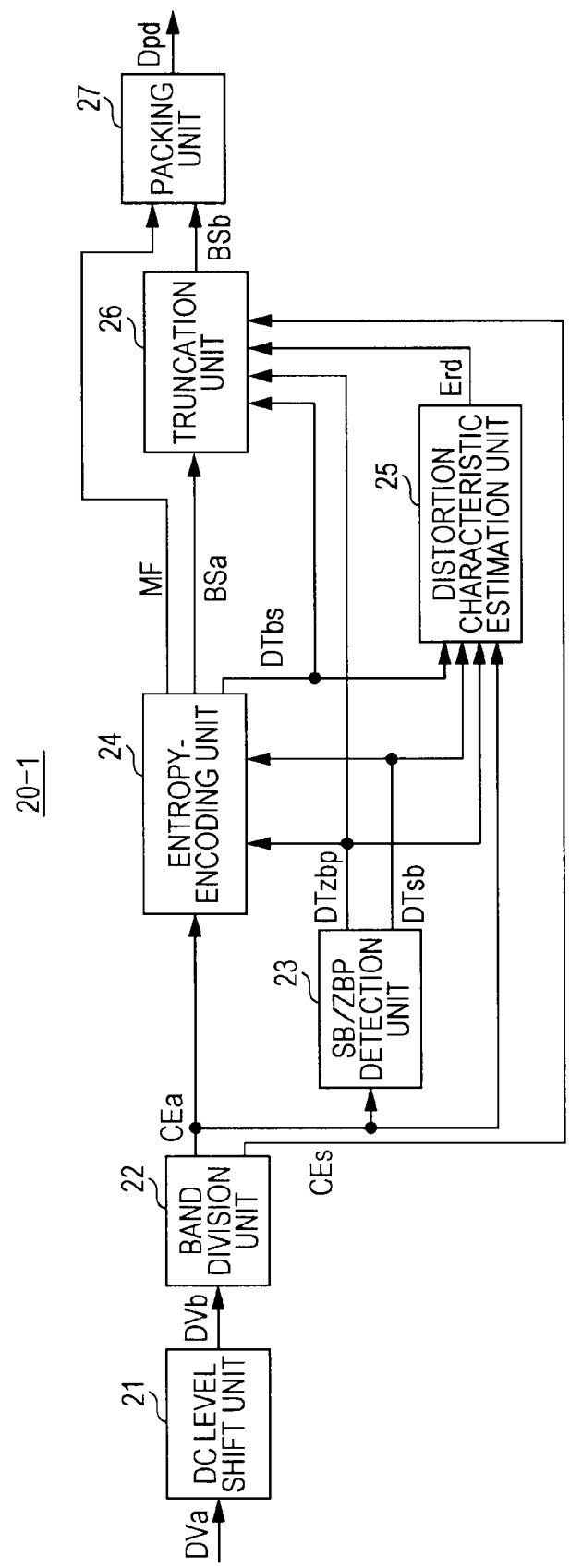
FIG. 5 is a diagram showing the configuration of an image encoding unit according to a first embodiment.

FIG. 5 is a diagram showing the configuration of an image encoding unit according to a first embodiment. The image encoding unit 20-1 includes a DC level shift unit 21, a band division unit 22, a Significant Bit (SB)/Zero Bit Plane (ZBP) detection unit 23, an entropy-encoding unit 24, a distortion characteristic estimation unit 25, a truncation unit 26 and a packing unit 27.

The DC level shift unit 21 performs level shift of a DC component of image data, in order to efficiently perform frequency band division by the band division unit 22. The DC level shift unit 21, for example, subtracts a DC value from input image data DVa of a block unit of M×N pixels and outputs the subtracted value to the band division unit 22. The DC level shift unit 21 uses, for example, a value of half of a dynamic range of image data DVa or an average value of image data DVa within a block of M×N pixels as a DC value. In addition, the DC value may be set to the same value by the image encoding unit 20-1 and the below-described image decoding unit 30-1 in advance or may be added to encoded data as additional information and supplied to the image decoding unit 30-1.

The band division unit 22 performs frequency band division of image data DVb output from the DC level shift unit 21. The band division unit 22 performs frequency band division again after rearranging a spatial position with respect to coefficient data of a low-band component obtained by frequency band division and generates coefficient data of each of a plurality of frequency bands from image data within a block of M×N pixels. The band division unit 22 performs frequency band division using, for example, Modified Discrete Wavelet Transform (MDWT). In MDWT, in addition to Discrete Wavelet Transform (DWT), in order to lessen the influence of deterioration of band division precision which is prone to appear in a block boundary of M×N pixels as distortion, the spatial position is rearranged with respect to coefficient data of a low-band component. Details of MDWT will be described later. The band division unit 22 outputs an absolute value CEa of MDWT coefficient data obtained by performing MDWT to the SB/ZBP detection unit 23, the entropy-encoding unit 24 and the distortion characteristic estimation unit 25. In addition, the band division unit 22 outputs a code CEs of the MDWT coefficient data obtained by performing MDWT to the truncation unit 26.

The SB/ZBP detection unit 23 detects a Significant Bit (SB) and a Zero Bit Plane (ZBP) from the absolute value of the MDWT coefficient data. The SB/ZBP detection unit 23 outputs an SB detection result DTsb to the entropy-encoding unit 24 and the distortion characteristic estimation unit 25. In addition, the SB/ZBP detection unit 23 supplies a ZBP detection result DTzbp to the entropy-encoding unit 24, the distortion characteristic estimation unit 25 and the truncation unit 26.

The entropy-encoding unit 24 entropy-encodes a bit plane of the absolute value CEa of the MDWT coefficient data, a ZBP and a Truncation Point (TP), using the absolute value CEa of the MDWT coefficient data, the SB detection result DTsb and the ZBP detection result DTzbp. The entropy-encoding unit 24 outputs a bit stream BSa obtained by performing entropy-encoding on the truncation unit 26. In addition, the entropy-encoding unit 24 outputs a bit stream length DTbs obtained by performing entropy-encoding to the distortion characteristic estimation unit 25 and the truncation unit 26. In addition, the entropy-encoding unit 24 outputs a mode flag MF obtained by performing entropy-encoding to the packing unit 27.

The distortion characteristic estimation unit 25 performs distortion characteristic estimation based on the absolute value CEa of the MDWT coefficient data, the SB detection result DTsb, the ZBP detection result DTzbp and the bit stream length DTbs and outputs a distortion characteristic estimation result Erd to the truncation unit 26. Specifically, a relationship between a variation in code amount and a variation in distortion amount of the image when performing truncation of the MDWT coefficient data is estimated to be the distortion characteristic.

The truncation unit 26 decides a bit stream and a code of encoding symmetry such that a code amount is within a predetermined target code amount using the bit stream BSa, the bit stream length DTbs, the ZBP detection result DTzbp, the code CEs and the distortion characteristic estimation result Erd. That is, the truncation unit 26 performs truncation of the bit stream and the code such that image distortion is low and a code amount is within a target code amount and outputs a truncated bit stream (including a code) BSb to the packing unit 27.

The packing unit 27 transforms the truncated bit stream BSb and the mode flag MF into a predetermined format and prepares encoded data Dpd which is decodable by the image decoding unit 30-1. The packing unit 27 outputs the prepared encoded data Dpd from the image encoding unit 20-1.

[2-2. Operation of Image Encoding Unit of First Embodiment]

Figure 6:
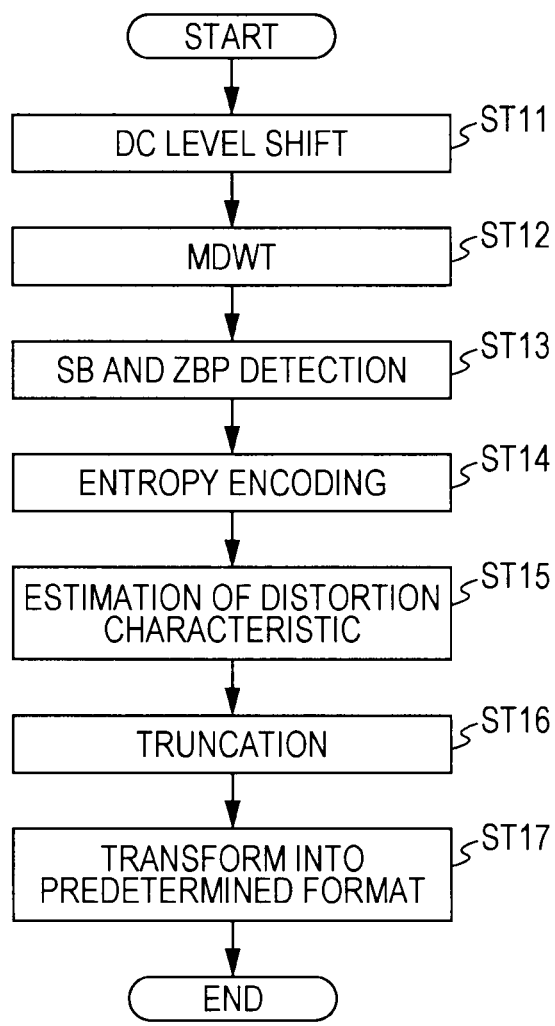
FIG. 6 is a flowchart illustrating an operation of an image encoding unit according to a first embodiment.

FIG. 6 is a flowchart illustrating an operation of an image encoding unit according to a first embodiment. In step ST11, the image encoding unit 20-1 performs DC level shift. The image encoding unit 20-1 performs DC level shift with respect to the input image data DVa by the DC level shift unit 21 and progresses to step ST12.

In step ST12, the image encoding unit 20-1 performs MDWT. The image encoding unit 20-1 performs MDWT with respect to the DC level shifted image data DVb by the band division unit 22, obtains the absolute value CEa of the MDWT coefficient data and the code CEs, and progresses to step ST13.

In step ST13, the image encoding unit 20-1 performs SB and ZBP detection. The image encoding unit 20-1 detects the SB and the ZBP from the absolute value CEa of the MDWT coefficient data by the SB/ZBP detection unit 23 and progresses to step ST14.

In step ST14, the image encoding unit 20-1 performs entropy-encoding. The image encoding unit 20-1 performs entropy-encoding with respect to the bit plane of the absolute value CEa of the MDWT coefficient data, the SB detection result DTsb and the ZBP detection result DTzbp by the entropy-encoding unit 24, obtains the bit stream BSa, the bit stream length DTbs and the mode flag MF, and progresses to step ST15.

In step ST15, the image encoding unit 20-1 performs distortion characteristic estimation. The image encoding unit 20-1 performs distortion characteristic estimation based on the absolute value CEa of the MDWT coefficient data, the SB detection result DTsb, the ZBP detection result DTzbp and the bit stream length DTbs by the distortion characteristic estimation unit 25 and progresses to step ST16.

In step ST16, the image encoding unit 20-1 performs truncation. The image encoding unit 20-1 performs truncation as necessary, based on the bit stream BSa, the bit stream length DTbs, the ZBP detection result DTzbp, the code CEs and the distortion characteristic estimation result Erd, by the truncation unit 26. The image encoding unit 20-1 performs truncation of the bit stream and the code when the bit stream length is not fitted into a target code length and progresses to step ST17 when the code length of the bit stream BSb is equal to or less than the target code length.

In step ST17, the image encoding unit 20-1 performs transform into a predetermined format. The image encoding unit 20-1 transforms additional information including the mode flag MF and the truncated bit stream BSb into a predetermined format using the packing unit 27, generates the encoded data Dpd and finishes an encoding process.

[2-3. Operation of Each Unit of Image Encoding Unit]

Next, operations of the main portions of the image encoding unit will be described.

[2-3-1. Operation of Band Division Unit]

The band division unit 22 rearranges the spatial position with respect to the coefficient data of the low-band component and lessens the influence of the deterioration of band division precision which is prone to appear in a block boundary of M×N pixels as distortion, for example, in addition to Discrete Wavelet Transform (DWT). The band division unit 22 may use any band division filter such as DWT.

FIGS. 7A to 7F are diagrams illustrating an operation of the band division unit 22 when a 5×3 lifting configuration, in which, for example, even the JPEG20-100 standard is employed, is used. FIG. 7A shows the image data DVb of a block unit output from the DC level shift unit 21 and shows the case where one block unit includes, for example, 8 pixels.

Figure 8:
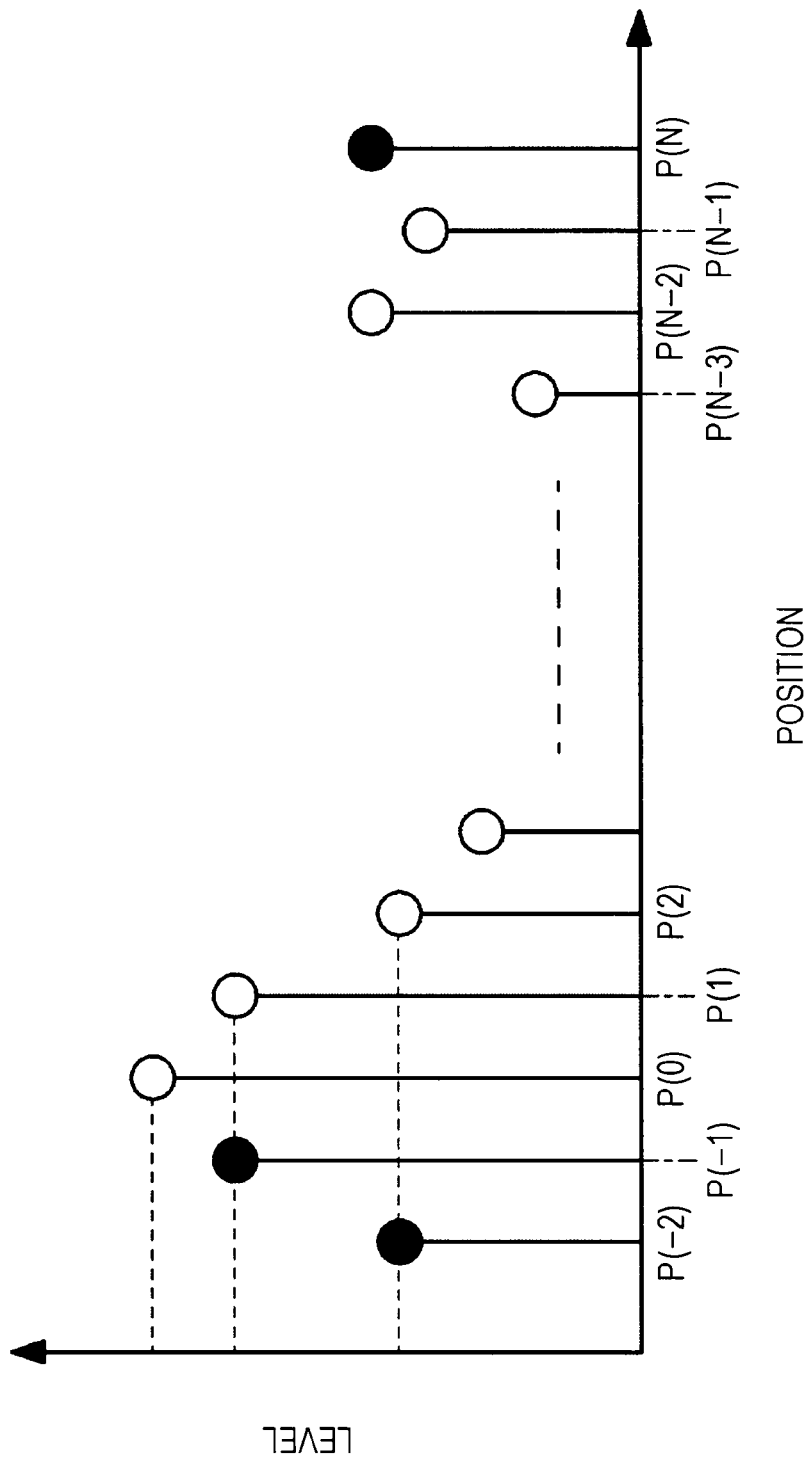
FIG. 8 is a diagram illustrating extension of image data.

The band division unit 22 performs extension of image data by returning a signal on the basis of an end of a block such that a boundary of an image has a symmetric property, in order to obtain outputs of the same pixels, with respect to the image data DVb of the block unit. For example, when the image data DVb is at pixel positions P(0) to P(N−1) as shown in FIG. 8, the band division unit 22 performs extension of image data such that the boundary of the image has a symmetric property. That is, a signal of a pixel position P(1) is extended to a signal of a pixel position P(−1), a signal of a pixel position P(2) is extended to a signal of a pixel position P(−2) and a signal of a pixel position P(N−2) is extended to a signal of a pixel position P(N). In addition, extension of image data is performed such that the outputs of the same pixels are obtained when DWT is performed.

The band division unit 22 performs extension of the image data DVb and generates extended image data shown in FIG. 7B. In addition, as shown in FIG. 7C, the band division unit 22 performs an operation using the extended image data and generates coefficient data CE-h of a high-pass component. In addition, the coefficient data CE-h of the high-pass component is denoted by a rightward rising oblique line.

Next, as shown in FIG. 7D, the band division unit 22 performs an operation using the extended image data and the coefficient data CE-h of the high-pass component and generates coefficient data CE-l of a low-band component. In addition, the coefficient data CE-l of the low-band component is denoted by a leftward rising oblique line.

In addition, the band division unit 22 performs deinterleaving of the coefficient data CE-h of the high-pass component and the coefficient data CE-l of the low-band component so as to generate a sub-band including the coefficient data CE-l of the low-band component and a sub-band including the coefficient data CE-h of the high-pass component as shown in FIG. 7E. The sub-band refers to a set of coefficient data classified for each frequency band. In addition, coefficient data CE-h(−1) of a high-pass component calculated using two extended signals is excluded from the sub-band of the high-pass component.

In this way, if the lifting operation or deinterleaving is performed, band division precision of both ends in which the extended image data is used is lowered. In particular, in the case of the coefficient data of the low-band component, from the point that the coefficient CE-l(0) of the low-band component is calculated using the coefficient data CE-h(−1) of the high-pass component calculated using the image data corresponding to the two extended pixels, a left end is sensitive to the influence of the deterioration of band division precision.

If band division is performed over repeated DWT by regarding the sub-band of the low-band component as an original image, the influence of the deterioration of band division precision is repeatedly applied to the left side of the low-band component. To this end, if band compression of the system or reduction of the memory is performed by encoding image data in block units of M×N pixels as distortion, the influence of the deterioration of band division precision of the left end is prone to appear on a block boundary of M×N pixels as distortion.

Accordingly, the band division unit 22 lowers the influence of the deterioration of band division precision which is prone to appear on the block boundary of M×N pixels such that visually remarkable deterioration is not caused even when a block size is small. In detail, with respect to the sub-band of the low-band component obtained by performing deinterleaving, rearrangement of the spatial position is performed such that the coefficient data of the low-band component calculated using the two extended signals is not used along with the two extended signals by the next frequency band division. For example, the band division unit 22 reverses the order of the coefficient data of the sub-band of the low-band component as shown in FIG. 7F. In this case, the coefficient data CE-l(0) of the low-band component calculated using the two extended signals is not used along with the two extended signals by calculation of the coefficient data of the low-band component of the next band division. Accordingly, the band division unit 22 is able to distribute the influence of the deterioration of band division precision when band division is repeated and to prevent the influence of the deterioration of band division precision which is prone to appear on the block boundary of M×N pixels as distortion.

The order of the coefficient data of the sub-band of the low-band component is not limited to the order shown in FIG. 7F and any order may be used if restoration may be performed by the image decoding unit 30-1. The order may be set in advance by the image encoding unit 20-1 and the image decoding unit 30-1. If information for identifying the rearrangement order is added to the encoded data, the image decoding unit 30-1 may accurately perform restoration.

In addition, the band division unit 22 may perform a variety of band division with respect to not only a one-dimensional block but also a two-dimensional M×N pixel block as shown in FIG. 9A or 9B, similar to the DWT of the related art. In addition, different filters may be used in a horizontal direction and a vertical direction. In the band division filter, a filter other than the DWT may be used. In FIG. 9A, the height of the frequency is "1 HH>1HL=1LH>2HH>2HL=2LH>3HH>3HL=3LH>3LL". In FIG. 9B, the height of the frequency is "1HH>1HL=1LH>2HL>3HL>3LL".

[2-3-2. Operation of SB/ZBP Detection Unit]

Figure 10:
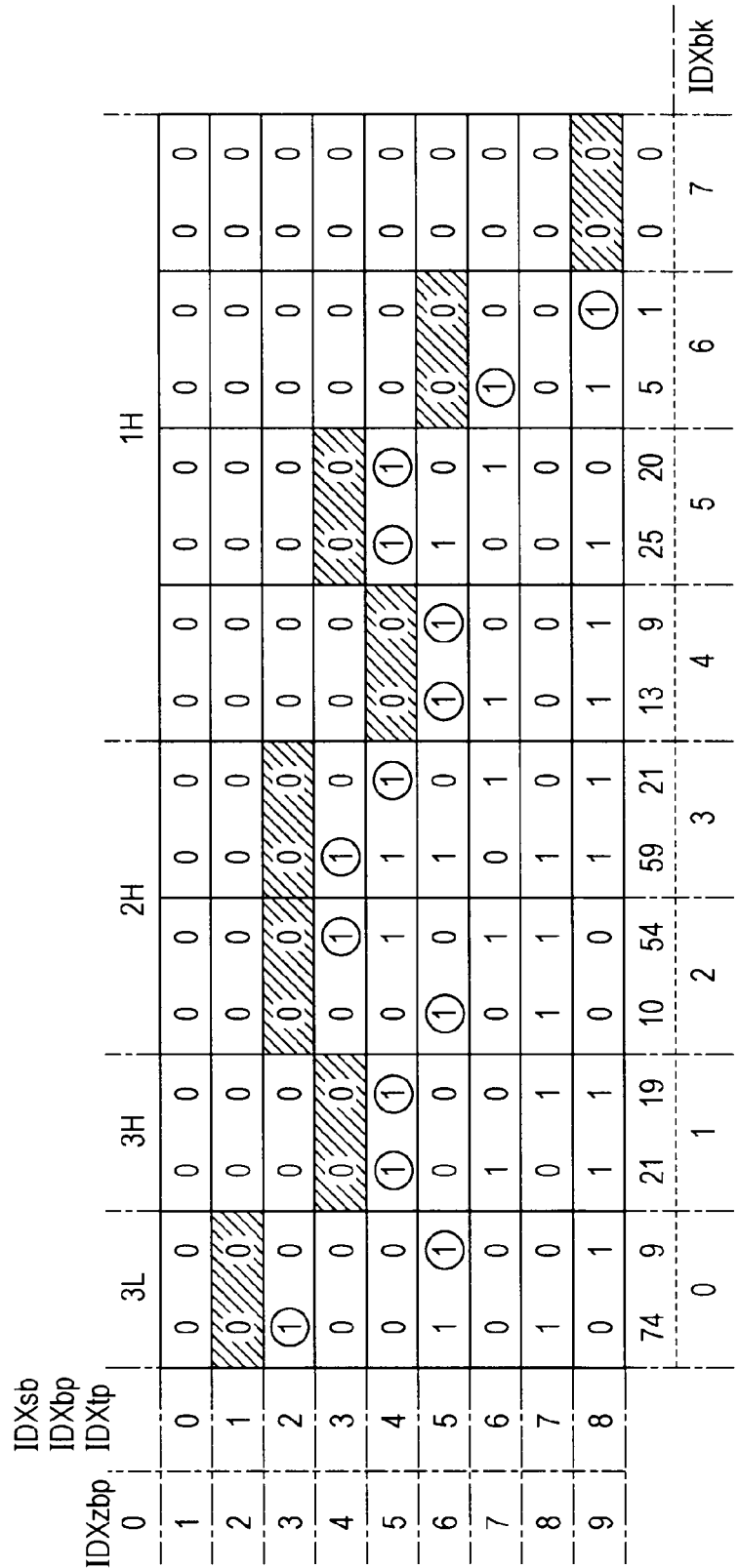
FIG. 10 is a diagram showing decompression of absolute values of Modified Discrete Wavelet Transform (MDWT) coefficient data in a bit depth direction.

The operation of the SB/ZBP detection unit 23 will be described. FIG. 10 shows the development of absolute values of the MDWT coefficient data output from the band division unit 22 in a bit depth direction. In addition, each bit depth plane is referred to as a bit plane. In FIG. 10, for example, coefficient data of a sub-band 3L is "74, 9", coefficient data of a sub-band 3H is "21, 19", coefficient data of a sub-band 2H is "10, 54, 59, 21", and coefficient data of a sub-band 1H is "13, 9, 25, 20-1, 5, 1, 0, 0". If MDWT coefficient data is "74 (decimal number)", coefficient data is expressed by "001001010" using a 9-bit bit stream in bit depth order. In addition, the height of the frequency is "1H>2H>3H>3L".

The SB is a bit which initially becomes "1" when an absolute value of each piece of coefficient data is viewed from a Most Significant Bit (MSB) side to a Least Significant Bit (LSB) side. In FIG. 10, a bit surrounded by a circle corresponds to an SB. The ZBP indicates a bit plane located one above an SB located on an MSB side within a sub-block when the absolute value of the MDWT coefficient data is divided into sub-blocks including J pieces of coefficient data. In FIG. 10, when a sub-block size is J=2, a bit plane denoted by an oblique line is a ZBP.

In the bit plane, the SB, the ZBP and the below-described TP, indexes are set in a bit depth direction. In FIG. 10, an index IDXbp of the bit plane of the MSB, an index IDXsb of the SB of the bit plane position of the MSB, and an index IDXtp of the TP are set to "0". In addition, an index IDXbp of the bit plane of the LSB, an index IDXsb of the SB of the bit plane of the LSB and an index IDXtp of the TP are set to "8". Since the ZBP represents the bit plane located one above the SB, an index IDXzbp of the ZBP is set to a value obtained by adding "1" to the index IDXsb of the SB, as shown in FIG. 10.

The SB/ZBP detection unit 23 performs an operation for obtaining the index IDXsb of the SB and the index IDXzbp of the ZBP. That is, as shown in FIG. 10, the SB/ZBP detection unit 23 obtains the index IDXsb of the SB for each piece of MDWT coefficient data as the SB detection result DTsb. In addition, the index IDXzbp of the ZBP is obtained for each sub-block including J pieces of coefficient data and the ZBP detection result is set to DTzbp. Although the absolute value of the one-dimensional MDWT coefficient data is shown in FIG. 10, bit precision or band division may be different or two-dimensional data may be used. That is, a sub-block size of the ZBP may be JxK. Although the sub-block size of the bit plane is equal to the size of the ZBP in FIG. 10, a different size, for example, ExF may be used.

[2-3-3. Operation of Entropy-Encoding Unit]

The operation of the entropy-encoding unit 24 will be described. The entropy-encoding unit 24 entropy-encodes three types of the index IDXzbp which is the ZBP detection result DTzbp, the index IDXtp of the TP, and the bit plane.

First, the entropy-encoding method of the index IDXzbp of the ZBP will be described. One ZBP exists in each sub-block. Since the ZBP statistically has a tendency to have a small index as belonging to a low-band component, using a band (sub-band) to which the ZBP belongs as a context, the index IDXzbp is changed to a symbol which is encoded data.

In detail, using a transform table shown in FIG. 11, a symbol corresponding to a combination of the index IDXzbp of the ZBP and a sub-band to which the ZBP belongs is selected as an encoding result.

The transform table shown in FIG. 11 uses, for example, a Huffman table or the like, which is prepared based on statistical data. If the ZBP statistically has a tendency to have a small index as belonging to a low-band component, for example, in a sub-band 3L, a symbol 00 in which the value of the index IDXzbp is small is set to a short bit stream. In addition, a symbol 09 or the like, in which the value of the index IDXzbp is large, is set to a bit stream longer than the symbol 00. In addition, for example, in a sub-band 1H, a symbol 09 in which the value of the index IDXzbp is large is set to a short bit stream. In addition, a symbol 00 or the like, in which the value of the index IDXzbp is small, is set to a bit stream longer than the symbol 09. By setting the bit length of the symbol based on the statistical data of the index IDXzbp, it is possible to increase the encoding efficiency of the ZBP.

In addition, the transform table is not limited to the case of using one transform table and a transform table used for encoding may be selected from among a plurality of transform tables. For example, two types of tables including a ZBP_Easy_table applied to the index IDXzbp (encoding is simple) of the ZBP relatively along statistical data and a ZBP_Hard_table applied to that (encoding is difficult) deviated from statistical data are used.

Figure 12:
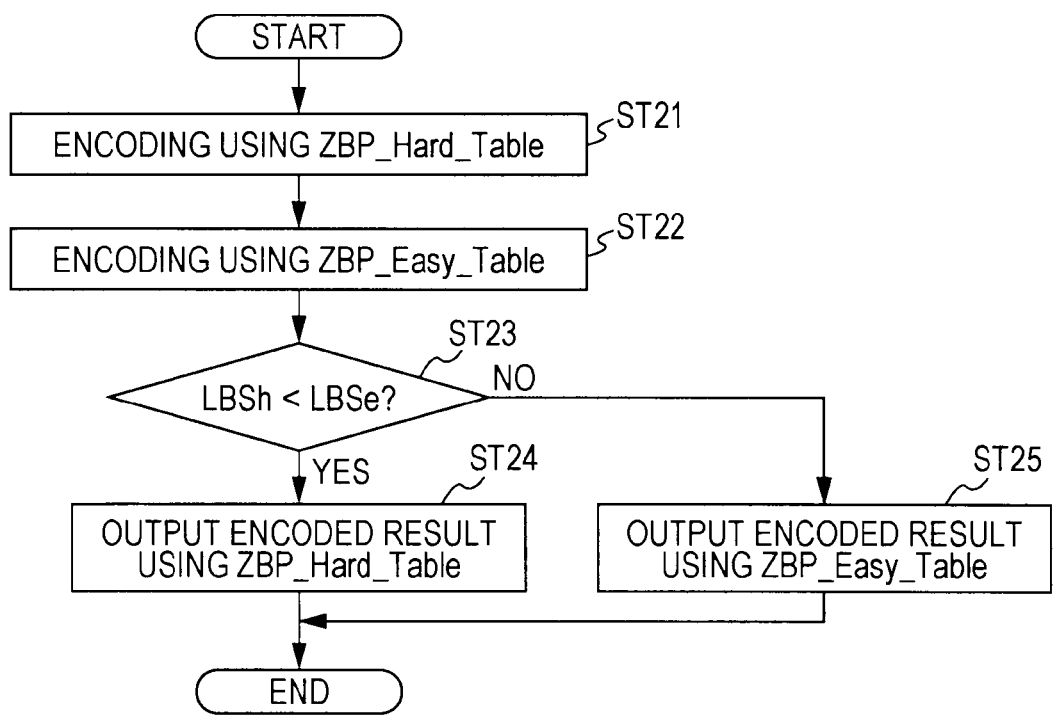
FIG. 12 is a flowchart illustrating an operation of the case of performing an entropy-encoding method of an index IDXzbp of ZBP.

FIG. 12 is a flowchart illustrating an operation in the case of performing the entropy-encoding method of the index IDXzbp of the ZBP using two types of transform tables.

In step ST21, the entropy-encoding unit 24 performs encoding of the ZBP_Hard_table. The entropy-encoding unit 24 selects a band to which the ZBP belongs and a symbol corresponding to the index IDXzbp of the ZBP from the ZBP_Hard_table so as to perform encoding of the index IDXzbp. In addition, the entropy-encoding unit 24 adds the bit length of the result of encoding the index IDXzbp of the sub-block, obtains a bit stream length LBSh of a block unit of M×N pixels, and progresses to step ST22.

In step ST22, the entropy-encoding unit 24 performs encoding using the ZBP_Easy_table. The entropy-encoding unit 24 selects a band to which the ZBP belongs and a symbol corresponding to the index IDXzbp of the ZBP from the ZBP_Easy_table so as to perform encoding of the index IDXzbp. In addition, the entropy-encoding unit 24 adds the bit length of the result of encoding the index IDXzbp of the sub-block, obtains a bit stream length LBSe of a block unit of M×N pixels, and progresses to step ST23.

In step ST23, the entropy-encoding unit 24 determines whether the bit stream length LBSh is shorter than the bit stream length LBSe. The entropy-encoding unit 24 progresses to step ST24 when the bit stream length LBSh is shorter than the bit stream length LBSe and progresses to step ST25 when the bit stream length LBSh is not shorter than the bit stream length LBSe.

In step ST24, the entropy-encoding unit 24 outputs the encoding result using the ZBP_Hard_table. In addition, in step ST25, the entropy-encoding unit 24 outputs the encoding result using the ZBP_Easy_table.

In this way, if a plurality of transform tables is used, a decision as to which of the transform tables is used is made by performing encoding using all transform tables and employing the transform table having the smallest bit stream length.

Figure 13:
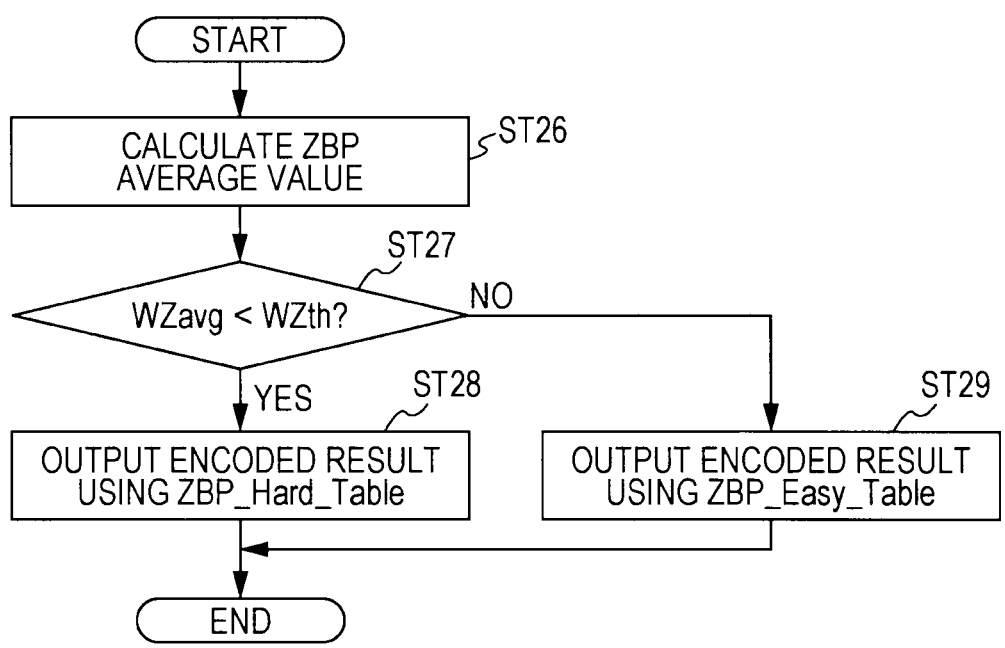
FIG. 13 is a flowchart illustrating another operation of the case of performing an entropy-encoding method of an index IDXzbp of ZBP.

FIG. 13 is a flowchart illustrating another operation in the case of performing the entropy-encoding method of the index IDXzbp of the ZBP using two types of transform tables.

In step ST26, the entropy-encoding unit 24 performs ZBP average value calculation. The entropy-encoding unit 24 calculates an average value WZavg of the index IDXzbp of the ZBP of a block unit of M×N pixels and progresses to step ST27.

In step ST27, the entropy-encoding unit 24 determines whether the average value WZavg is smaller than a threshold WZth. The entropy-encoding unit 24 progresses to step ST28 when it is determined that the average value WZavg of the index IDXzbp of the ZBP is smaller than the threshold WZth and progresses to step ST29 when it is determined that the average value WZavg of the index IDXzbp of the ZBP is not smaller than the threshold WZth.

In step ST28, the entropy-encoding unit 24 outputs the encoding result using the ZBP_Hard_table. The entropy-encoding unit 24 selects a band to which the ZBP belongs and a symbol corresponding to the index IDXzbp of the ZBP from the ZBP_Hard_table and outputs the selected symbol as the encoding result.

In step ST29, the entropy-encoding unit 24 outputs the encoding result using the ZBP_Easy_table. The entropy-encoding unit 24 selects a band to which the ZBP belongs and a symbol corresponding to the index IDXzbp of the ZBP from the ZBP_Easy_table and outputs the selected symbol as the encoding result.

In this way, if a plurality of transform tables is used, a decision as to which of the transform tables is used is made based on the average value WZavg of the index IDXzbp of the ZBP.

In addition, if a plurality of transform tables is used, to allow the image decoding unit 30-1 to determine which of the transform tables is used for encoding, the mode flag is set so as to be able to determine the transform table used for encoding.

Next, the entropy-encoding method of the index IDXtp of the TP will be described. Similar to the ZBP, the index IDXtp of the TP is, for example, encoded using the Huffman table for each sub-block shown in FIG. 14 so as to generate a bit stream. Since the TP is decided by the truncation unit 26, when entropy-encoding is performed, the index IDXtp of the TP is still not decided. Accordingly, all those which may become the index IDXtp of the TP are entropy encoded. In detail, the indexes IDXtp of the TPs of all positions of a bit plane located one below the ZBP are entropy encoded such that the TP is set at any position of the bit plane located below the ZBP of FIG. 10. In addition, a plurality of transform tables may be used similar to the case of the ZBP. For example, two types of tables including a TP_Easy_table applied to the index (where encoding is simple) of the TP relatively in line with statistical data and a TP_Hard_table applied to that (encoding is difficult) deviated from statistical data are used.

Figure 15:
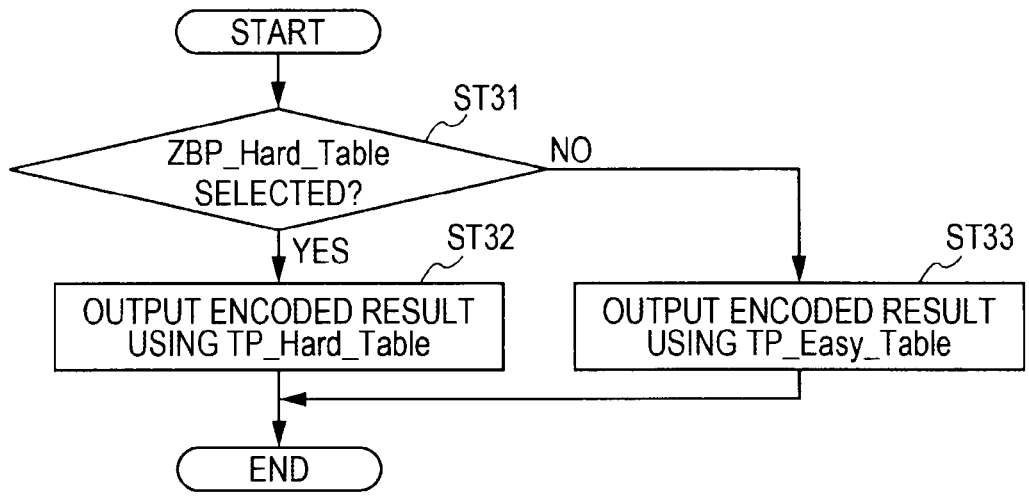
FIG. 15 is a flowchart illustrating an operation of the case of performing an entropy-encoding method of an index IDXtp of TP.

FIG. 15 is a flowchart illustrating an operation in the case of performing the entropy-encoding method of the index IDXtp of the TP using two types of transform tables. In step ST31, the entropy-encoding unit 24 determines whether the ZBP_Hard_table is selected. The entropy-encoding unit 24 progresses to step ST32 when the ZBP_Hard_table is selected and progresses to step ST33 when the ZBP_Hard_table is not selected.

In step ST32, the entropy-encoding unit 24 outputs the encoding result using the TP_Hard_table. The entropy-encoding unit 24 selects a band to which the TP belongs and a symbol corresponding to the index IDXtp of the TP from the TP_Hard_table so as to perform encoding of the index IDXtp, and outputs the selected symbol as the encoding result.

In step ST33, the entropy-encoding unit 24 outputs the encoding result using the TP_Easy_table. The entropy-encoding unit 24 selects a band to which the TP belongs and a symbol corresponding to the index IDXtp of the TP from the TP_Easy_table so as to perform encoding of the index IDXtp, and outputs the selected symbol as the encoding result.

In this way, if a plurality of transform tables is used, a decision as to which of the transform tables is used is made by employing a transform table which tends to be similar to the transform table employed by the ZBP.

Figure 16:
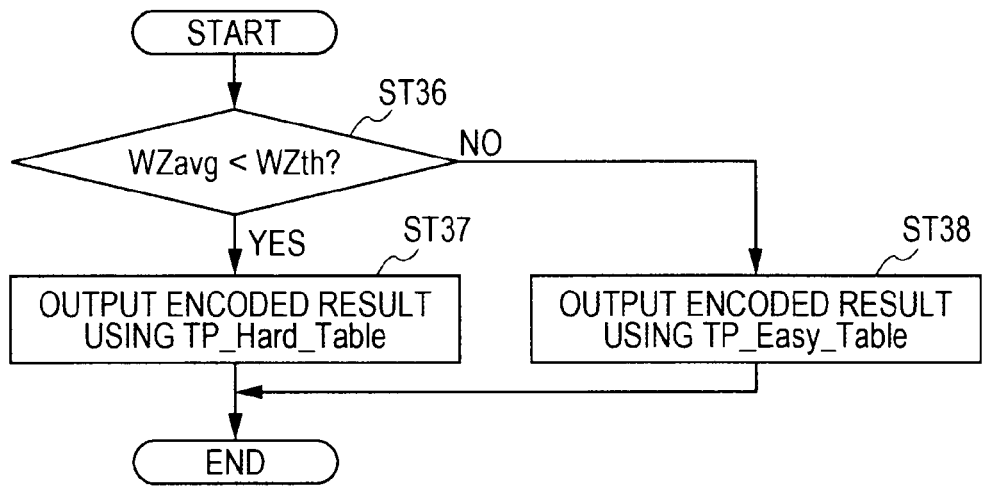
FIG. 16 is a flowchart illustrating another operation of the case of performing an entropy-encoding method of an index IDXtp of TP.

FIG. 16 is a flowchart illustrating another operation in the case of performing the entropy-encoding method of the index IDXtp of the TP using two types of transform tables.

In step ST36, the entropy-encoding unit 24 determines whether an average value WZavg is less than a threshold WZth. The entropy-encoding unit 24 progresses to step ST37 when it is determined that the average value WZavg of the index IDXzbp of the ZBP is less than the threshold WZth and progresses to step ST38 when the average value WZavg of the index IDXzbp of the ZBP is not less than the threshold WZth.

In step ST37, the entropy-encoding unit 24 outputs the encoding result using the TP_Hard_table. The entropy-encoding unit 24 selects a band to which the TP belongs and a symbol corresponding to the index IDXtp of the TP from the TP_Hard_table so as to perform encoding of the index IDXtp and outputs the selected symbol as the encoding result.

In step ST38, the entropy-encoding unit 24 outputs the encoding result using the TP_Easy_table. The entropy-encoding unit 24 selects a band to which the TP belongs and a symbol corresponding to the index IDXtp of the TP from the TP_Easy_table so as to perform encoding of the index IDXtp and outputs the selected symbol as the encoding result.

In this way, if a plurality of transform tables is used, a decision as to which of the transform tables is used is made by using the average value WZavg of the index IDXzbp of the ZBP.

As shown in FIGS. 15 and 16, the reason why the index IDXzbp of the ZBP is used is because the TP is not decided when the index IDXsb of the SB and the index IDXzbp of the ZBP are obtained and thus the index itself of the TP is not used as the context. In addition, this is because efficient encoding is performed using correlation between the index IDXzbp of the ZBP and the index IDXtp of the TP.

In addition, if a plurality of transform tables is used, to allow the image decoding unit 30-1 to determine which of the transform tables is used for encoding, the mode flag is set so as to determine the transform table used for encoding.

Next, the encoding method of the bit plane will be described. In the bit plane, as shown in FIG. 10, the absolute values of the MDWT coefficient data are decompressed in the bit depth direction. In addition, the bit plane is divided into sub-blocks. For example, in FIG. 10, a bit plane in which the index IDXbp of a sub-block (a sub-block having an index IDXbk of "0") of the leftmost sub-band 3L is "2" becomes "1, 0". The value "1, 0" is encoded using the following method.

Even in the entropy-encoding of the bit plane, similarly, a bit stream is generated by referring to, for example, one or a plurality of Huffman tables. In the entropy-encoding of the bit plane, unlike the ZBP or the TP, the coefficient bit (for example, the value of "1, 0") of the bit plane is encoded. As the context of the transform table, the index IDXbp of the bit plane, the sub-band to which the bit plane belongs, the below-described SB_flag or the like are used.

If the index IDXbp of the bit plane is used as the context, statistics of the distribution "1" and "0" of the bit plane may be used. That is, if the bit depth of the bit plane is shallow (the index is small), the value of the bit plane is prone to become "0". If the bit depth of the bit plane is deep (the index is large), "1" and "0" are prone to have the same distribution as the value of the bit plane. Using the statistics of such a distribution, it is possible to increase encoding efficiency.

If the sub-band to which the bit plane belongs is used as the context, as there is a tendency for an absolute value of the MDWT coefficient data to be larger in a lower band, correlation between this tendency and the tendency of "0" and "1" of the bit plane may be used. The SB_flag is a context using an SB state and, in detail, is a flag representing whether an SB is present at a higher bit than a bit plane to be encoded in the case where the bit plane to be encoded is encoded. The SB_flag is generated based on the index IDXsb which is the SB detection result DTsb. For example, in FIG. 17, a bit surrounded by a circle is an SB represented by the index IDXsb. If the index IDXbp encodes a bit plane of "4", the SB_flag becomes "1, 0". If the SB_flag includes "0", the value of the bit plane is also prone to become "0". Accordingly, by using the SB_flag as, for example, the context of the Huffman table, it is possible to improve encoding efficiency. Even in the encoding of the bit plane, a plurality of transform tables may be prepared.

Figure 18:
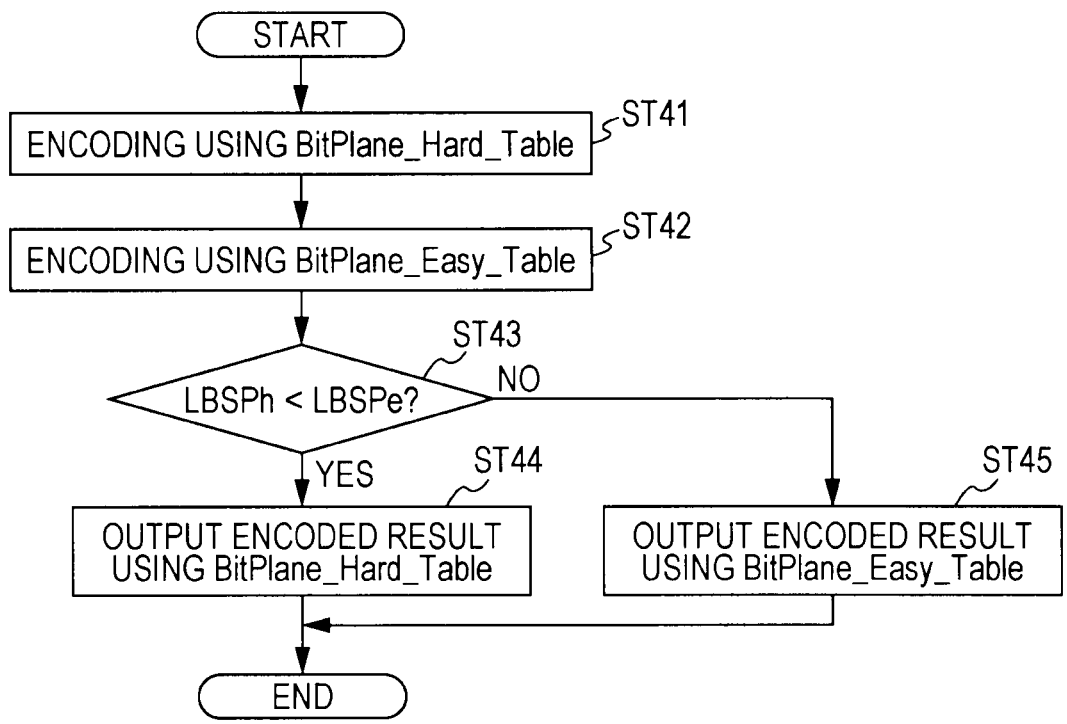
FIG. 18 is a flowchart illustrating an operation of the case of performing an entropy-encoding method of a bit plane.

FIG. 18 is a flowchart illustrating an operation in the case of performing the entropy-encoding method of the bit plane using two types of transform tables.

In step ST41, the entropy-encoding unit 24 performs encoding using a BitPlane_Hard_table. The entropy-encoding unit 24 performs encoding of the bit plane using the BitPlane_Hard_table, obtains a bit stream length LBSPh, and progresses to step ST42.

In step ST42, the entropy-encoding unit 24 performs encoding using a BitPlane_Easy_table. The entropy-encoding unit 24 performs encoding of the bit plane using the BitPlane_Easy_table, obtains a bit stream length LBSPe, and progresses to step ST43.

In step ST43, the entropy-encoding unit 24 determines whether the bit stream length LBSPh is shorter than the bit stream length LBSPe. The entropy-encoding unit 24 progresses to step ST44 if the bit stream length LBSPh is shorter than the bit stream length LBSPe and progresses to step ST45 if the bit stream length LBSPh is not shorter than the bit stream length LBSPe.

In step ST44, the entropy-encoding unit 24 outputs the encoding result obtained by performing the encoding of the bit plane using the BitPlane_Hard_table. In addition, in step ST45, the entropy-encoding unit 24 outputs the encoding result obtained by performing the encoding of the bit plane using the BitPlane_Easy_table.

In this way, if a plurality of transform tables is used, a decision as to which of the transform tables is used is made by performing encoding at all the transform tables and employing the transform table having the smallest bit stream length.

In addition, if a plurality of transform tables is used, to allow the image decoding unit 30-1 to determine which of the transform tables is used for encoding, the mode flag is set so as to determine the transform table used for encoding.

The entropy-encoding unit 24 records the bit stream lengths when the bit streams are generated, in each of the entropy-encoding of the ZBP, the TP and the bit plane. These are necessary in the distortion characteristic estimation unit 25 of a subsequent stage. In particular, the bit stream lengths of the TP and the bit plane are necessary to be recorded in each bit plane and each sub-block, in order to perform truncation.

[2-3-4. Operation of Distortion Characteristic Estimation Unit]

The operation of the distortion characteristic estimation unit 25 will be described. The truncation unit 26 performs truncation such that the bit stream BSa and the code CEs obtained by the entropy-encoding result are fitted into a target code length. The truncation unit 26 determines which bit stream of which bit plane is used and which bit stream of which bit plane is truncated, in order to obtain optimal image quality within the target code length. To this end, the distortion characteristic estimation unit 25 estimates the distortion characteristic representing a relationship between a code amount and distortion, in order to determine which bit plane is truncated by the truncation unit 26.

The distortion characteristic estimation unit 25 is an algorithm for estimating the distortion characteristic representing the relationship between the code amount and distortion and uses, for example, a method disclosed in "David Taubman, Michael Marcellin, JPEG2000: Image Compression Fundamentals, Standards and Practice (The Springer International Series in Engineering and Computer Science)", paragraph 8.3.5 "DISTORTION COMPUTATION".

The distortion characteristic estimation unit 25 calculates a slope ($\Delta Di(p)/\Delta Ri(p)$) representing a variation in encoding distortion of a code length from the code length ($\Delta Ri(p)$) of each bit plane of a sub-block size and encoding distortion ($\Delta Di(p)$) generated when truncating the bit plane of the sub-block. Equation (1) shows a calculation equation of the encoding distortion ($\Delta D_i^{(p)}$).

$$\Delta D_i^{(p)} = G_{bi}\Delta_i^2 2^{2p} \left( \sum_{j, v_i^{(p)}[j]=1} T_s(\tilde{v}_i^{(p+1)}[j]) + \sum_{j, v_i^{(p)}[j]>1} T_m(2\tilde{v}_i^{(p+1)}[j]) \right) \quad (1)$$

In Equation (1), "p" denotes the index IDXbp of the bit plane, "i" denotes the index IDXbk of the sub-block allocated in a horizontal direction of FIG. 10, and "j" denotes a set of MDWT coefficient data within a sub-block as a vector. In addition, "Gb" denotes a weight of a b-th sub-band (frequency) and $\Delta$ denotes a quantization step width. Ts or the like of Equation (1) is expressed by Equations (2) to (5).

$$\tilde{v}_i^{(p)}[j] = \frac{|y_i[j]|}{2^p\Delta} - v^{(p)}[j] \quad (2)$$

$$v^{(p)}[j] = \left\lfloor \frac{|y_i[j]|}{2^p\Delta_i} \right\rfloor \quad (3)$$

$$T_s(\tilde{v}) = (2\tilde{v})^2 - \left(2\tilde{v} - \frac{3}{2}\right)^2 \quad (4)$$

$$T_m(\tilde{v}) = (2\tilde{v} - 1)^2 - \left(2\tilde{v} - \lfloor 2\tilde{v} \rfloor - \frac{1}{2}\right)^2 \quad (5)$$

In Equations (2) and (3), $y_i[j]$ denotes MDWT coefficient data.

In addition, the distortion characteristic estimation unit 25 increases a weight of a bit plane of a sub-block of an end of a block when encoding is performed in block units, thereby lessening block distortion. In detail, an operation of Equation (6) is performed and a weight indicating whether or not a sub-block belongs to a boundary between blocks is added to the encoding distortion ($\Delta D_i^{(p)}$).

$$EC\Delta D_i^{(p)} = Wi \times \Delta D_i^{(p)} \quad (6)$$

In Equation (6), "Wi" denotes a weight determined depending on whether an i-th sub-block (a sub-block having an index IDXbk of "i") belongs to a boundary between blocks and the value of $EC\Delta D_i^{(p)}$ is increased if the sub-block belongs to the boundary between blocks. That is, the sub-block belonging to the boundary between blocks enables distortion when this sub-block is truncated to be further increased than before weighting and enables truncation to become more difficult than for a sub-block of another position.

The distortion characteristic estimation unit 25 calculates $EC\Delta D_i^{(p)}$ and outputs the slope ($EC\Delta D_i^{(p)}/\Delta Ri(p)$) to the truncation unit 26 as the distortion characteristic estimation result Erd.

Figure 19:
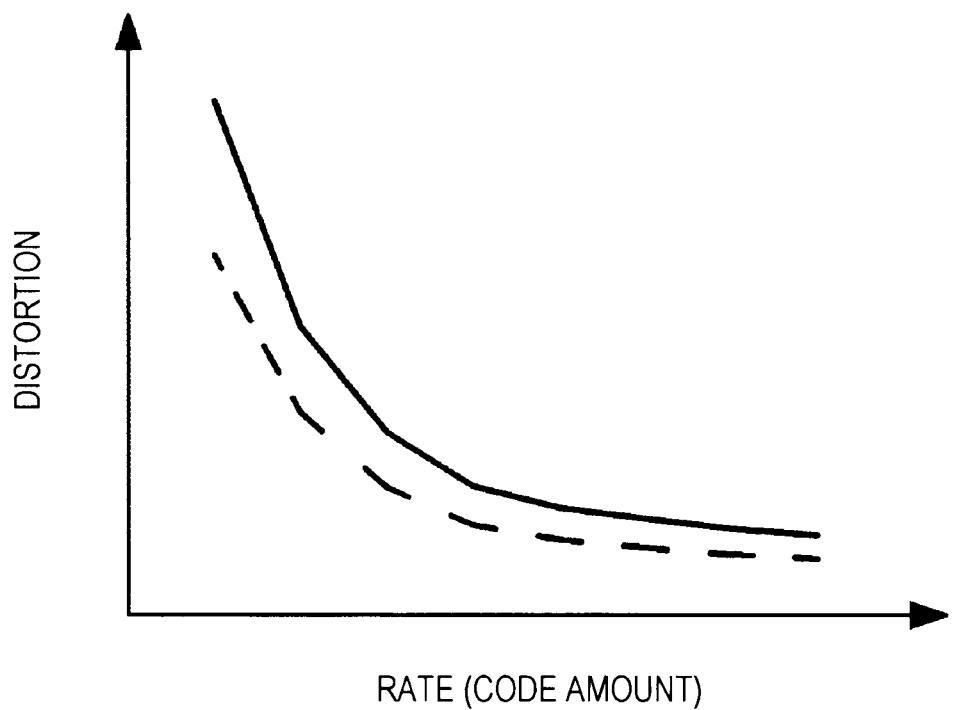
FIG. 19 is a diagram showing an R-D curve.

The distortion characteristic estimation unit 25 may calculate $EC\Delta D_i^{(p)}$ with respect to each sub-block and each bit plane or may calculate $EC\Delta D_i^{(p)}$ by a necessary portion by calculating and storing portions having a tendency in advance as a table. In addition, based on the calculated $EC\Delta D_i^{(p)}$, for example, an R (rate)-D (distortion) curved line shown in FIG. 19 may be obtained and stored for each sub-block and a variation in encoding distortion when a bit plane of a sub-block is deleted may be estimated from this R-D curve. In addition, in FIG. 19, a solid line denotes a curved line of a sub-block belonging to the boundary between blocks and a dotted line denotes a curved line of a sub-block which does not belong to the boundary between blocks.

[2-3-5. Operation of Truncation Unit]

The truncation unit 26 performs sorting of the bit plane for obtaining optimal image quality within the target code length based on the distortion characteristic estimation result Erd output from the distortion characteristic estimation unit 25. FIGS. 20A to 21B are diagrams illustrating the operation of the truncation unit 26.

The truncation unit 26 initializes the TP at the position of the ZBP. FIG. 20A shows a state in which the ZBP and the TP overlap each other. In addition, a rightward rising oblique line denotes a ZBP and a leftward rising oblique line denotes a TP.

In the state of FIG. 20A, the truncation unit 26 compares the value of the slope ($EC\Delta D_i^{(p)}/\Delta Ri(p)$) of a bit plane located one below each TP. The truncation unit 26 moves the TP to the bit plane having the largest value ($EC\Delta D_i^{(p)}/\Delta Ri(p)$). For example, when the value ($EC\Delta D_i^{(p)}/\Delta Ri(p)$) of a sub-block "0" is largest, as shown in FIG. 20B, the truncation unit 26 moves the TP from a bit plane "1" to a bit plane "2" in the sub-block "0". That is, the truncation unit 26 performs processing so that truncation is not performed on the bit plane which is determined to experience the most increased encoding distortion when truncation is performed.

Similarly, the truncation unit 26 compares the value ($EC\Delta D_i^{(p)}/\Delta Ri(p)$) of the bit plane located one below each TP again after updating the position of the TP and moves the TP to the bit plane having the largest value ($EC\Delta D_i^{(p)}/\Delta Ri(p)$). For example, when the value ($EC\Delta D_i^{(p)}/\Delta Ri(p)$) of a sub-block "2" is largest, as shown in FIG. 20C, the truncation unit 26 moves the TP from a bit plane "2" to a bit plane "3" in the sub-block "2".

Figure 21A:
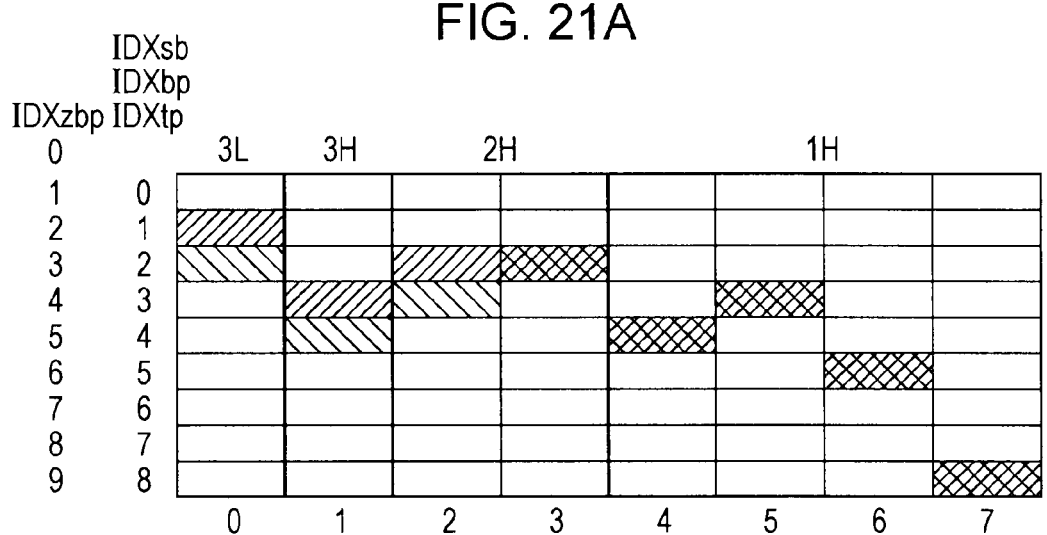
FIGS. 21A to 21B are (second) diagrams illustrating an operation of a truncation unit.
Figure 21B:
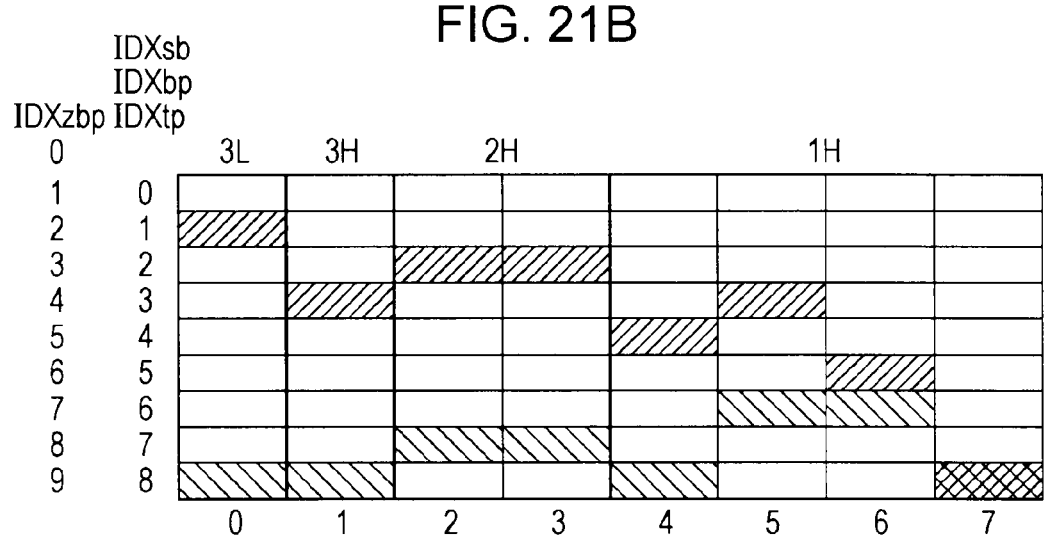

The truncation unit 26 compares the value ($EC\Delta D_i^{(p)}/\Delta Ri(p)$) of a bit located one below the TP and repeats a process of moving the TP based on the compared result until a target code length of a bit stream reaches a total code length or until all comparison is completed. In addition, FIG. 21B shows a state in which the total code length of the bit stream reaches the target code length.

The total code length of the bit stream is a sum of the bit lengths of the indexes IDXzbp of all ZBPs, a bit plane from a position located one below the ZBP to the TP, the indexes IDXtp of all TP at a current position, and each encoding result of the code of the MDWT coefficient data. In the encoding of the code of the MDWT coefficient data, the MDWT coefficient data is encoded up to the current position of the TP and, when truncation is performed with respect to a position located below the current position, only the code corresponding to the significant coefficient data (other than 0) is encoded. The encoding method includes, for example, a method of adding "0" if the code is positive and adding "1" if the code is negative or an entropy-encoding method.

Figure 22:
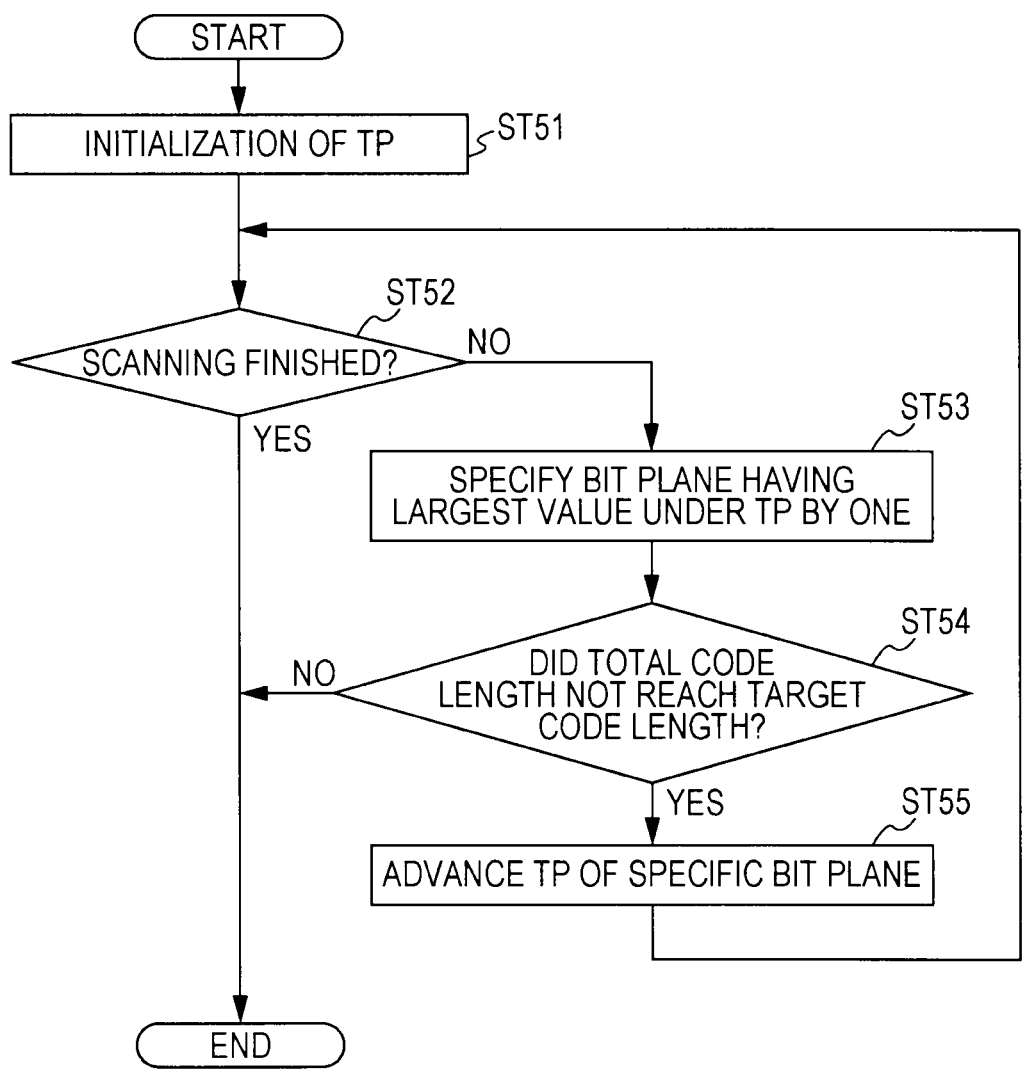
FIG. 22 is a flowchart showing an operation of a truncation unit.

FIG. 22 is a flowchart illustrating the operation of the truncation unit 26. In step ST51, the truncation unit 26 performs initialization of the TP. The truncation unit 26 progresses to step ST52 in a state in which the TP is set to the position of the ZBP.

In step ST52, the truncation unit 26 determines whether scanning is finished. The truncation unit 26 finishes the process when the scanning of all bit planes and the code is finished and progresses to step ST53 when the scan is not finished.

In step ST53, the truncation unit 26 specifies the bit plane having the largest value located one below the TP. The truncation unit 26 compares the value ($EC\Delta D_i^{(p)}/\Delta Ri(p)$) of the bit plane located one below the TP, specifies a bit plane having the largest value, and progresses to step ST54.

In step ST54, the truncation unit 26 determines whether the total code length reaches the target code length. When the TP proceeds to a specific bit plane in step ST53, the truncation unit 26 progresses to step ST55 when the total code length of the bit stream is not equal to or less than the target code length and finishes the process when the total code length of the bit stream is equal to or less than the target code length.

In step ST55, the truncation unit 26 performs a process to advance the TP to the specific bit plane. The truncation unit 26 performs advancing of the TP to the bit plane specified in ST53 and returns to step ST52.

The truncation unit 26 performs a process such that the total code length of the bit stream is equal to or less than the target code length. In addition, in the truncation, in the case where all bit planes are encoded, lossless encoding is performed. In addition, in the case where the total code length is shorter than the target code length, lossless encoding may be performed using the same algorithm and thus image quality is improved compared with the DPCM of Japanese Patent No. 3918263. Even in the case where lossless encoding is not performed, since truncation is repeated until the total code length becomes almost the target code length, it is possible to reduce the number of bits which are invalid within the encoded data.

[2-3-6. Operation of Packing Unit]

The packing unit 27 transforms the mode flag MF and the bit stream (ZBP, TP, bit plane, code) Bsb after truncation into a predetermined format, and generates encoded data Dpd which is decodable by the image decoding unit 30-1. The mode flag MF may be entropy-encoded as necessary or the bit stream may be encoded without change. In addition, as necessary, a comment, a DC value or supplementary information for a decoding/image quality improvement function may be collected and encoded. The format of the encoded data may be arbitrarily selected if it is a format decodable by the image decoding unit 30-1. There are the following restrictions.

Before decoding each bit stream, a mode flag corresponding thereto is decoded.

Before decoding the bit plane, the ZBP and the TP is decoded.

Before decoding the code, the bit plane is decoded.

Figure 23:
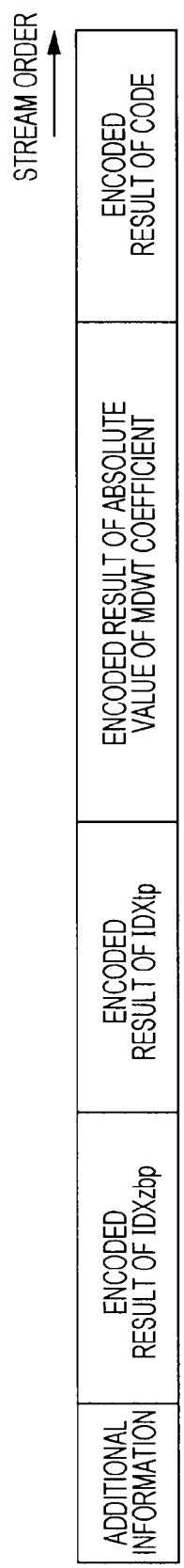
FIG. 23 is a diagram showing an example of a format.

FIG. 23 shows an example of the format. For example, first, the bit stream of the additional information, and next, the bit stream of the encoding result of the index IDXzbp representing the ZBP are provided. Thereafter, the bit stream of the encoding result of the index IDXtp representing the TP, the bit stream of the encoding result of the absolute value of the MDWT coefficient data, and the bit stream of the encoding result of the code are sequentially provided and output to the image decoding unit 30-1 or the like. In addition, the packing unit 27 may have a function for collecting the encoded data of a plurality of component signals as one piece of encoding data.

[2-4. Configuration of Image Decoding Unit of First Embodiment]

Figure 24:
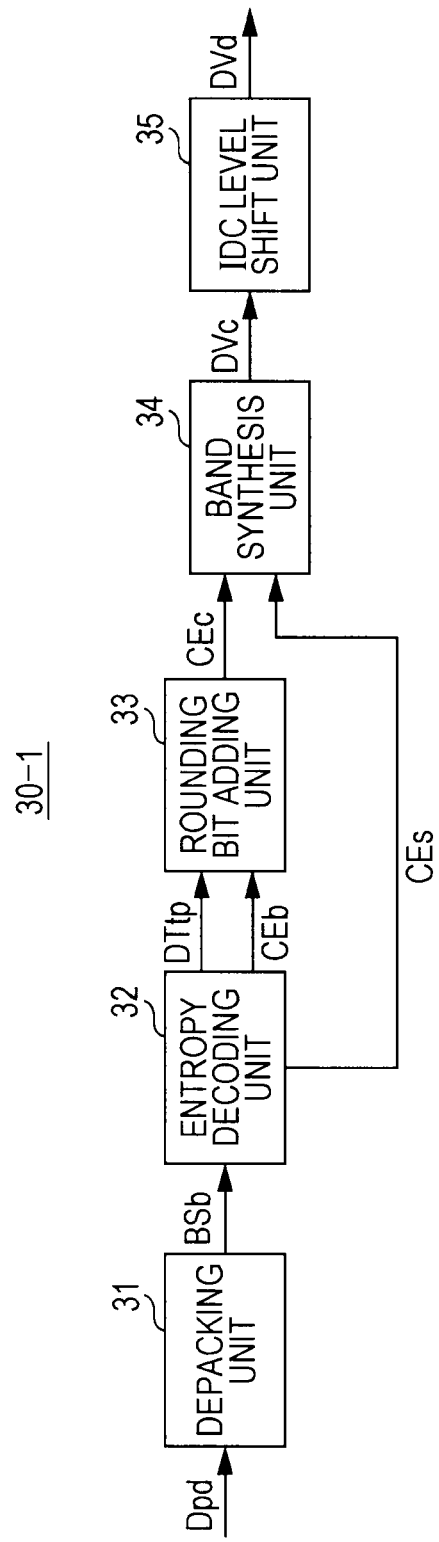
FIG. 24 is a diagram showing the configuration of an image decoding unit according to a first embodiment.

The configuration of the image decoding unit of the first embodiment is shown in FIG. 24. The image decoding unit 30-1 includes a depacking unit 31, an entropy decoding unit 32, a rounding bit adding unit 33, a band synthesis unit 34, an IDC level shift unit 35, and the like.

The depacking unit 31 receives the encoded data Dpd having the predetermined format, which is generated by the image encoding unit 20-1, performs analysis, and acquires additional information necessary for decoding the bit stream by the entropy decoding unit 32. The depacking unit 31 decouples, for example, the bit stream and the information (including the mode flag) necessary for decoding the bit stream from the encoded data having the format shown in FIG. 23. In addition, if the encoded data of the plurality of component signals is collected as one piece of encoded data, the depacking unit 31 performs such decoupling and outputs a decodable bit stream BSb to the entropy decoding unit 32.

The entropy decoding unit 32 performs entropy decoding of the bit stream BSb output from the depacking unit 31, obtains the indexes IDXzbp and IDXtp of the ZBP and the TP, and performs decoding of the absolute value of the MDWT coefficient data using the indexes. The entropy decoding unit 32 outputs the decoded absolute value CEb of the MDWT coefficient data and the index IDXtp of the TP to the rounding bit adding unit 33. The entropy decoding unit 32 outputs the code CEs to the band synthesis unit 34.

The rounding bit adding unit 33 estimates the bit stream of the bit plane truncated by the image encoding unit 20-1 and performs restoration of the absolute value of the MDWT coefficient data, based on the absolute value CEb of the MDWT coefficient data and the index IDXtp of the TP. The rounding bit adding unit 33 outputs the restored absolute value CEc of the MDWT coefficient data to the band synthesis unit 34.

The band synthesis unit 34 performs Inverse Modified Discrete Transform using the restored absolute value CEc of the MDWT coefficient data and the code CEs. The Inverse Modified Discrete Transform is a process of returning the coefficient data obtained by the band division unit 22 of the image encoding unit 20-1 to the image data before the transform. The band synthesis unit 34 outputs encoded DC level shift data DVc obtained by Inverse Modified Discrete Transform to the IDC level shift unit 35.

The IDC level shift unit 35 adds a DC value to the decoded DC level shift data DVc and outputs image data DVd of a block unit to the outside of the image decoding unit 30-1. The DC value is equal to the DC value used in the DC level shift unit 21 of the image encoding unit 20-1.

In the truncation unit, when lossless encoding is performed without performing truncation, the encoded DC level shift data DVc is equal to the image data DVb and the image data DVd becomes equal to the image data DVa.

[2-5. Operation of Image Decoding Unit of First Embodiment]

Figure 25:
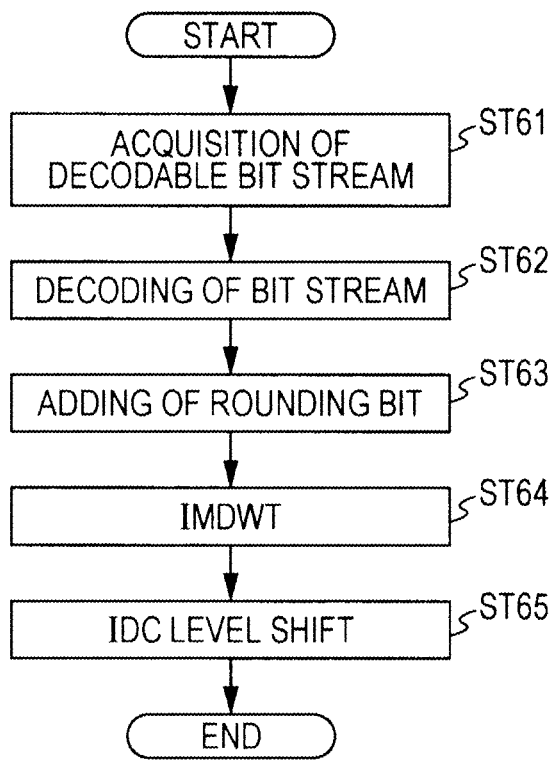
FIG. 25 is a flowchart illustrating an operation of an image decoding unit according to a first embodiment.

The operation of the image decoding unit of the first embodiment will be described using the flowchart of FIG. 25. In step ST61, the image decoding unit 30-1 performs acquisition of the decodable bit stream. The image decoding unit 30-1 analyzes the encoded data having the predetermined format using the depacking unit 31, acquires the decodable bit stream from the encoded data, and progresses to step ST62.

In step ST62, the image decoding unit 30-1 performs decoding of the bit stream. The entropy decoding unit 32 of the image decoding unit 30-1 decodes the indexes IDXzbp and IDXtp representing the ZBP and the TP and then decodes the absolute value of the MDWT coefficient data using the indexes. In addition, the entropy decoding unit 32 performs decoding of the code and progresses to step ST63.

In step ST63, the image decoding unit 30-1 performs adding of a rounding bit. The image decoding unit 30-1 estimates and sets the bit stream of the bit plane truncated by the image encoding unit 20-1 as the rounding bit in the rounding bit adding unit 33. In addition, the rounding bit adding unit 33 adds the estimated rounding bit to the decoded absolute value of the MDWT coefficient data, performs restoration of the absolute value of the MDWT coefficient data, and progresses to step ST64.

In step ST64, the image decoding unit 30-1 performs Inverse Modified Discrete Wavelet Transform (IMDWT). The band synthesis unit 34 of the image decoding unit 30-1 performs IMDWT using the restored absolute value of the MDWT coefficient data and the decoded code, obtains a decoded DC level shift signal, and progresses to step ST65.

In step ST65, the image decoding unit 30-1 performs an IDC level shift. The image decoding unit 30-1 adds the DC level to the decoded DC level shift signal in the IDC level shift unit 35, obtains decoded image data, and finishes the process.

[2-6. Operation of Each Unit of Image Decoding Unit]
[2-6-1. Operation of Entropy Decoding Unit]

Next, the operation of the entropy decoding unit 32 will be described. The entropy decoding unit 32 receives the bit stream supplied from the depacking unit 31 and the additional information (including the mode flag representing the transform table used for encoding of the bit stream) necessary for decoding as an input.

The entropy decoding unit 32 decodes the index IDXzbp of the ZBP and the index IDXtp of the TP. The index IDXzbp of the ZBP and the index IDXtp of the TP are encoded using, for example, one or a plurality of Huffman tables, as described in the operation of the entropy-encoding unit 24 of the image encoding unit 20-1. Accordingly, the entropy decoding unit 32 determines, by the mode flag, which of the transform tables is used for the encoding.

Figure 26:
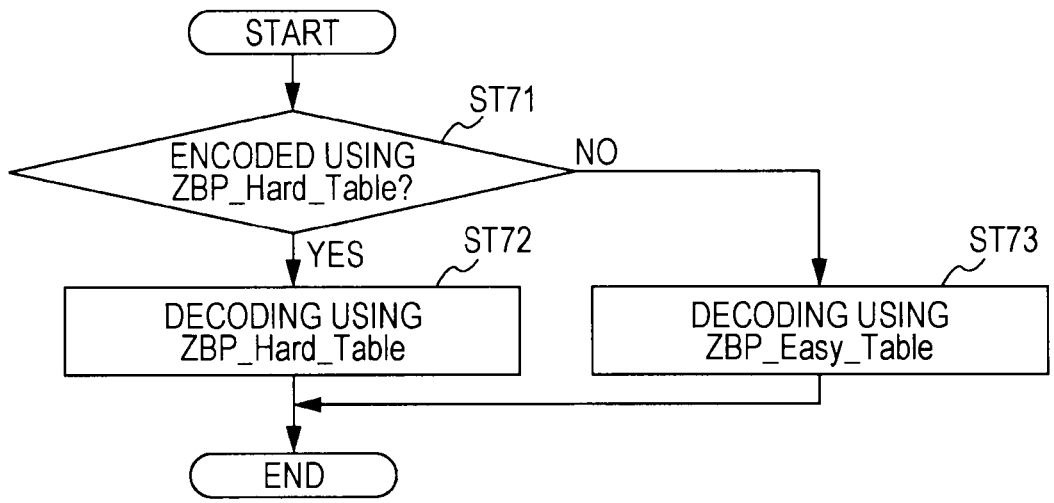
FIG. 26 is a flowchart illustrating a decoding operation of an index IDxzbp of ZBP.

FIG. 26 is a flowchart illustrating the decoding operation of the index IDXzbp of the ZBP. In step ST71, the entropy decoding unit 32 determines whether encoding is performed using the ZBP_Hard_table. The entropy decoding unit 32 determines the transform table used for encoding of the index IDXzbp of the ZBP based on the mode flag of the additional information. The entropy decoding unit 32 progresses to step ST72 when it is determined that the ZBP_Hard_table is used and progresses to step ST73 when it is determined that the ZBP_Easy_table is used.

In step ST72, the entropy decoding unit 32 performs decoding using the ZBP_Hard_table. The entropy decoding unit 32 performs decoding using the ZBP_Hard_table, acquires the index IDXzbp of the ZBP, and finishes the decoding operation.

In step ST73, the entropy decoding unit 32 performs decoding using the ZBP_Easy_table. The entropy decoding unit 32 performs decoding using the ZBP_Easy_table, acquires the index IDXzbp of the ZBP, and finishes the decoding operation.

Figure 27:
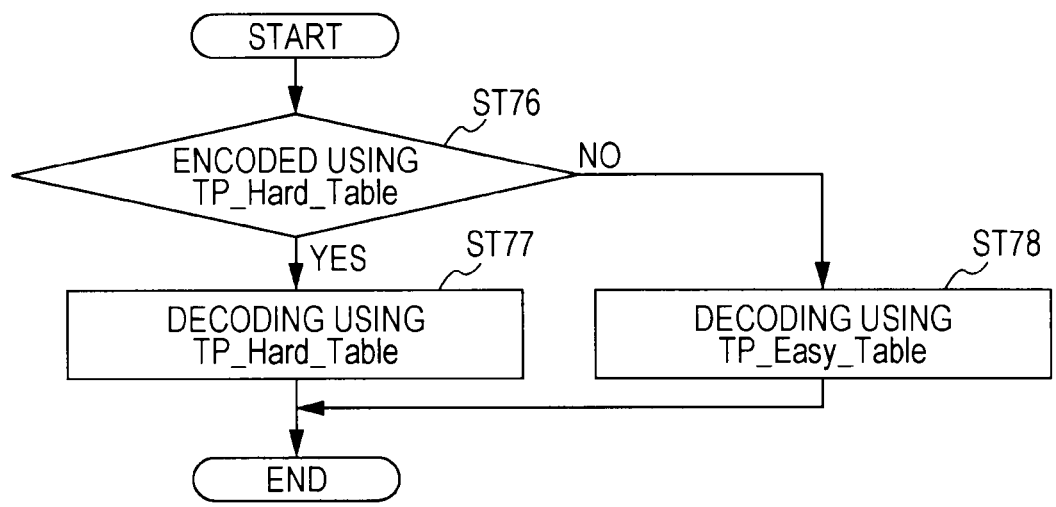
FIG. 27 is a flowchart illustrating a decoding operation of an index IDxtp of TP.

FIG. 27 is a flowchart illustrating the decoding operation of the index of the TP. In step ST76, the entropy decoding unit 32 determines whether encoding is performed using the TP_Hard_table. The entropy decoding unit 32 determines the transform table used for encoding of the index IDXtp of the TP based on the additional information. The entropy-encoding unit 32 progresses to step ST77 when it is determined that the TP_Hard_table is used and progresses to step ST78 when it is determined that the TP_Easy_table is used.

In step ST77, the entropy decoding unit 32 performs decoding using the TP_Hard_table. The entropy decoding unit 32 performs decoding using the TP_Hard_table, acquires the index IDXtp of the TP, and finishes the decoding operation.

In step ST78, the entropy decoding unit 32 performs decoding using the TP_Easy_table. The entropy decoding unit 32 performs decoding using the TP_Easy_table, acquires the index IDXtp of the TP, and finishes the decoding operation.

As a result of decoding the index IDXzbp of the ZBP and the index IDXtp of the TP, it is determined which part of the bit plane is encoded. For example, in FIG. 28, the position represented by the index IDXzbp of the ZBP obtained by decoding is represented by a rightward rising oblique line. The position represented by the index IDXtp of the TP obtained by decoding is represented by a leftward rising oblique line. If the index IDXzbp of the ZBP and the index IDXtp of the TP are obtained, a range from the bit plane located below the ZBP to the bit plane represented by the index IDXtp of the TP may be determined as an encoded range. In addition, from the point that the encoded range becomes apparent, it is determined to which sub-block of which bit plane the data obtained by decoding the bit stream belongs.

Figure 28:
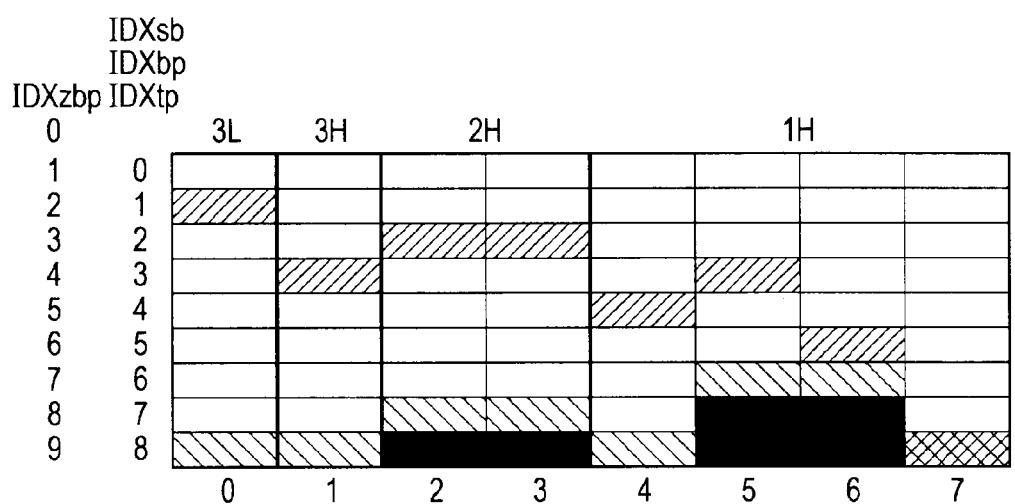
FIG. 28 is a diagram showing the result of decoding an index IDXzbp of ZBP and an index IDXtp of TP.

In FIG. 28, the filled bit plane located below the bit plane represented by the index IDXtp of the TP is a bit plane truncated by the image encoding unit 20-1.

The bit stream representing the absolute value of the MDWT coefficient data is encoded using, for example, one or a plurality of Huffman tables, as described in the operation of the entropy-encoding unit 24 of the image encoding unit 20-1. The entropy decoding unit 32 determines which transform table is used to perform encoding according to the mode flag of the additional information.

Figure 29:
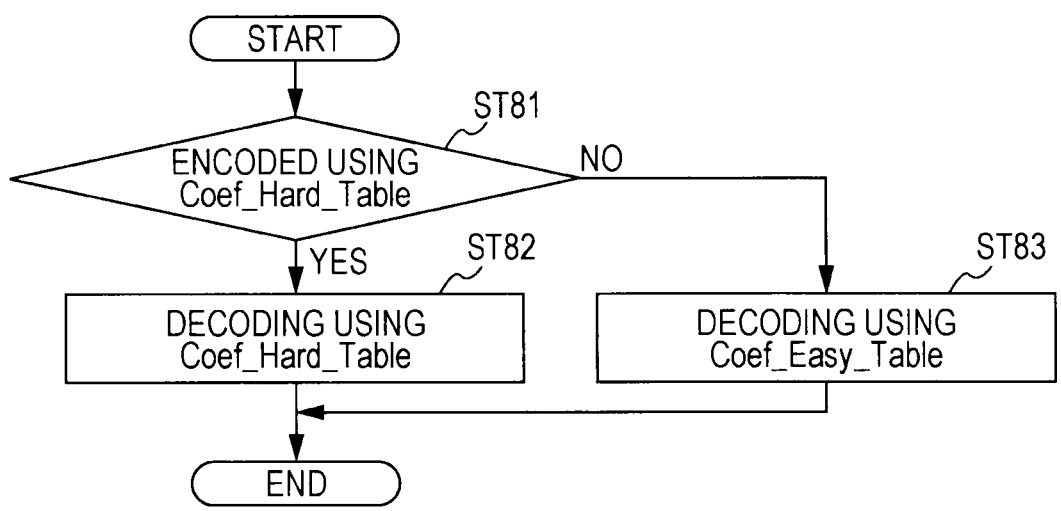
FIG. 29 is a flowchart illustrating a decoding operation of a bit stream representing an absolute value of coefficient data.

FIG. 29 is a flowchart illustrating the decoding operation of the bit stream representing the absolute value of the MDWT coefficient data. In step ST81, the entropy decoding unit 32 determines whether encoding is performed using the Coef_Hard_table. The entropy decoding unit 32 determines the transform table used for encoding of the absolute value of the MDWT coefficient data based on the additional information. The entropy decoding unit 32 progresses to step ST82 when it is determined that the Coef_Hard_table is used and progresses to step ST83 when it is determined that the Coef_Easy_table is used.

In step ST82, the entropy decoding unit 32 performs decoding using the Coef_Hard_table. The entropy decoding unit 32 performs decoding using the Coef_Hard_table, acquires the data representing the absolute value of the MDWT coefficient data, and finishes the decoding operation.

In step ST83, the entropy decoding unit 32 performs decoding using the Coef_Easy_table. The entropy decoding unit 32 performs decoding using the Coef_Easy_table, acquires the data representing the absolute value of the MDWT coefficient data, and finishes the decoding operation. In addition, the example of the transform table or the context is the same as for those described as the operation of the entropy-encoding unit 24 of the image encoding unit 20-1.

[2-6-2. Operation of Rounding Bit Adding Unit]

The rounding bit adding unit 33 estimates a lower-order bit truncated by the image encoding unit 20-1 and restores the absolute value of the MDWT coefficient data. The rounding bit adding unit 33 determines the position of the lower-order bit truncated by the image encoding unit 20-1 based on the index IDXtp of the TP and estimates the data of the determined position. For example, in the case shown in FIG. 28, the rounding bit adding unit 33 estimates the data of the filled bit plane located below the bit plane indicated by the index IDXtp of the TP.

There are several estimation methods, but, as an example of a simple method, the estimated data is acquired by referring to a table prepared based on statistics in advance. For example, the rounding bit adding unit 33 sets the value according to the index IDXtp of the TP as estimated data using the index IDXtp of the PT as the context, as shown in FIG. 30. The reason why the index IDXtp of the TP is used as the context is because the value is appropriately added by the position of the truncated bit plane. The rounding bit adding unit 33 adds the estimated data to the data representing the absolute value of the coefficient data and outputs the added data to the band synthesis unit 34.

[2-6-3. Operation of Band Synthesis Unit]

The band synthesis unit 34 performs Inverse Modified Discrete Wavelet Transform (IMDWT) which is the inverse modified discrete transform of the MDWT performed by the image encoding unit 20-1. As described in the image encoding unit 20-1, the MDWT is fundamentally equal to the DWT, but replacement of the spatial position of the low-band signal is performed whenever band division is performed in order to improve band division precision of a signal end. Accordingly, the band synthesis unit 34 returns the spatial position of the low-band signal in the input MDWT coefficient data to an original position by the inverse operation of the operation performed upon encoding. Thereafter, similar to the IDWT, deinterleaving, target period extension and two-stage lifting operation are performed to perform band synthesis. In addition, in a case where band synthesis is repeated, an operation for returning the low-band signal to the original spatial position is first performed. The band synthesis unit 34 performs such a process and generates the decoded DC level shift signal.

Figure 31A:
FIGS. 31A to 31F are diagrams illustrating an operation of a band synthesis unit.
Figure 31B:
Figure 31C:
Figure 31D:
Figure 31E:
Figure 31F:
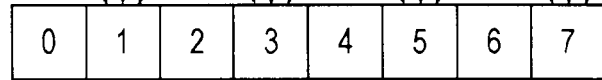

FIGS. 31A to 31F are diagrams illustrating the operation of the band synthesis unit 34. FIG. 31A shows the MDWT coefficient data. The band synthesis unit 34 performs a process of returning the spatial position of the low-band signal to the original position by the inverse operation of the operation performed upon encoding, as shown in FIG. 31B. Next, the band synthesis unit 34 performs deinterleaving as shown in FIG. 31C and performs target period extension as shown in FIG. 31D. Thereafter, the band synthesis unit 34 performs the 2-stage lifting operation so as to perform band synthesis as shown in FIGS. 31E and 31F and generates the decoded DC level shift signal shown in FIG. 31F.

In addition, the IMDWT may reconfigure not only a one-dimensional signal but also various signals which are band-divided with respect to a two-dimensional block, similar to the IDWT of the related art. In addition, different filters may be used in a horizontal direction and a vertical direction. In the signal reconfiguration filter, a filter other than the IDWT may be used.

In this way, when encoding or decoding of the image data is performed by the image encoding unit 20-1 and the image decoding unit 30-1, since the spatial position is rearranged with respect to the coefficient data of the low-band component obtained by frequency band division, frequency band division is repeated with respect to the coefficient data of the low-band component. Even when the coefficient data of each of the plurality of frequency bands is generated, for example, since the position of the coefficient data of the low-band component generated using the extended image data is not fixed, the influence of the deterioration of band division precision is not repeatedly applied due to the use of the extended image data. Accordingly, even when image encoding is performed in block units, a decoded image with low block distortion is obtained.

The coefficient data is divided as a sub-block for each predetermined number and a variation in the distortion amount of the image when the bit plane of the coefficient data is truncated for each sub-block is estimated. With respect to the estimation result, the sub-block located on the end of the block is weighted so as to be not easily truncated compared with the sub-block of another position. Based on the estimation result after weighting, the truncation position in which image distortion is low and the code amount is within the target code amount is detected and the truncation of the coefficient data or the like is performed. Accordingly, since the risk of the coefficient data of the end of the block being truncated can be suppressed, it is possible to lessen distortion in the boundary between blocks.

3. Second Embodiment

[3-1. Configuration of Image Encoding Unit of Second Embodiment]

Figure 32:
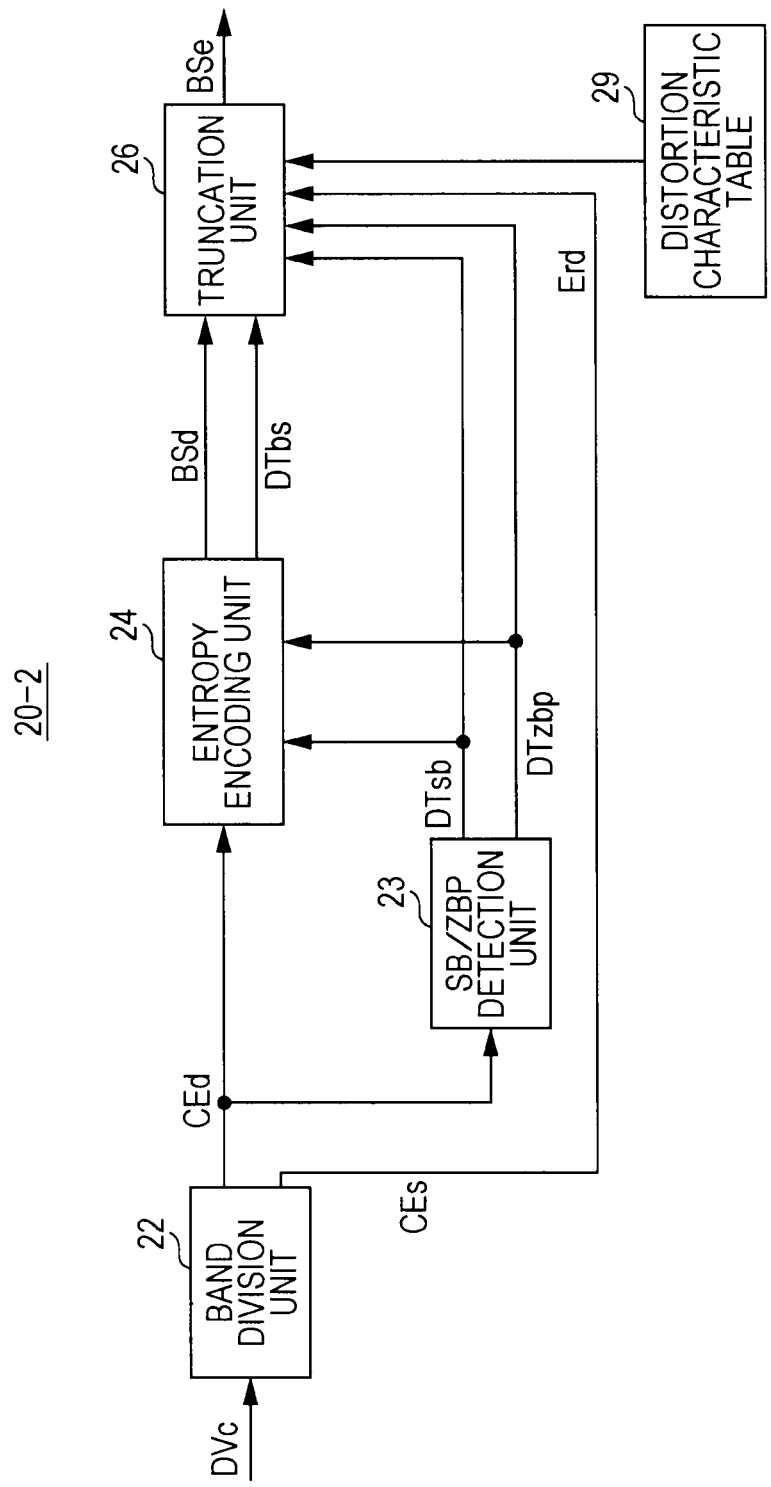
FIG. 32 is a diagram showing the simple configuration of an image decoding unit.

The configurations of the image encoding unit and the image decoding unit are not limited to the configuration of FIG. 5 or FIG. 24. FIG. 32 shows the configuration of an image encoding unit of a second embodiment.

The image encoding unit 20-2 has the configuration in which the DC level shift unit 21, the distortion characteristic estimation unit 25 and the packing unit 27 are omitted from the image encoding unit 20-1 shown in FIG. 5.

In this case, the band division unit 22 performs MDWT with respect to the input image data, instead of the DC level shifted signal. In addition, if the distortion characteristic estimation unit 25 which becomes a criterion for performing truncation is omitted, for example, the encoding distortion $EC\Delta D_i^{(p)}$ or the slope $(EC\Delta D_i^{(p)}/\Delta Ri(p))$ is calculated by the distortion characteristic estimation unit 25 in advance, and is stored in a distortion characteristic table 29. The distortion characteristic table is input to the truncation unit 26 and the truncation unit 26 performs truncation based on the distortion characteristic table. In addition, in the entropy-encoding unit 24, if the number of encoding tables used in the ZBP, the TP and the bit plane is one and there is no information added to the truncated bit stream, the truncated bit stream may be output from the image encoding unit 20-2 as encoded data. In this case, the packing unit 27 may also be omitted.

[3-2. Configuration of Image Decoding Unit of Second Embodiment]

Figure 33:
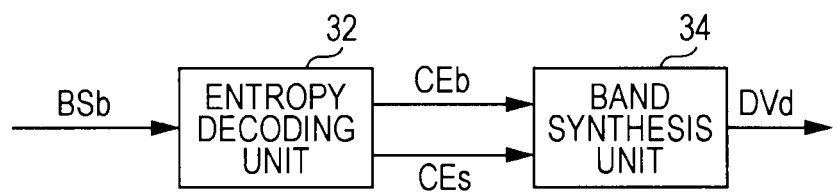
FIG. 33 is a diagram showing the simple configuration of an image encoding unit.

FIG. 33 shows the configuration of the image decoding unit of the second embodiment. The image decoding unit 30-2 has the configuration in which the depacking unit 31, the rounding bit adding unit 33 and the IDC level shift unit 35 are omitted from the image decoding unit 30-1 shown in FIG. 24.

If the encoded data generated by the image encoding unit 20-2 shown in FIG. 32 includes only the bit stream and does not include additional information, the depacking unit 31 may not be provided in the image decoding unit 30-2. In addition, since the rounding bit adding unit 33 is not a component necessary for decoding and is provided for the purpose of improving the image quality of the decoded signal, the rounding bit adding unit may be omitted. In the case where DC level shift is not performed in the image encoding unit 20-2, the IDC level shift unit 35 may not be provided. Accordingly, if the image decoding unit 30-2 of the configuration shown in FIG. 33 is used, the bit stream output from the image encoding unit 20-2 may be decoded.

4. Third Embodiment

[4-1. Configuration of Image Encoding Unit of Third Embodiment]

Figure 34:
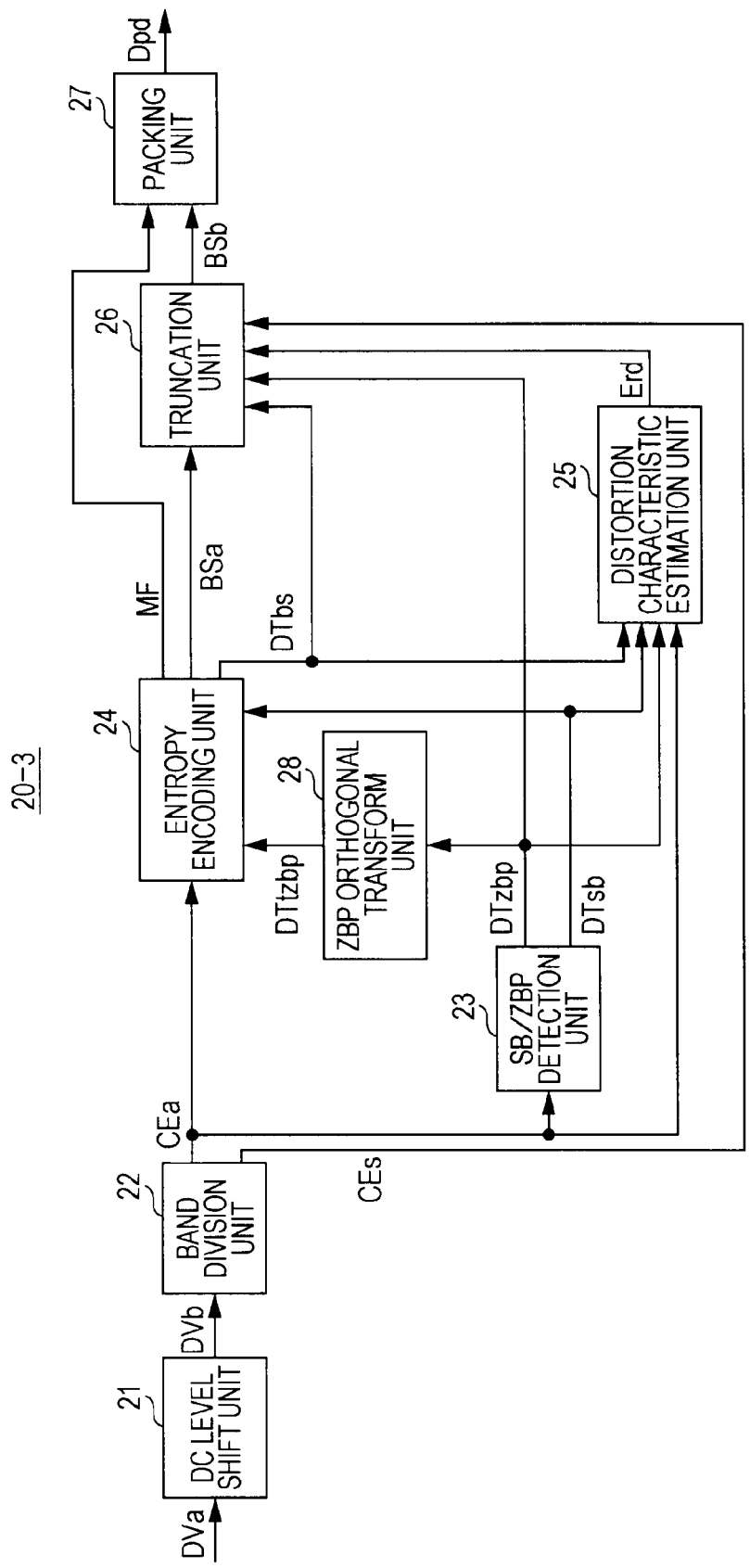
FIG. 34 is a diagram showing the configuration of an image decoding unit according to a second embodiment.

Next, a third embodiment which may further increase encoding efficiency as compared with the above-described first and second embodiment will be described. FIG. 34 shows the configuration of the image encoding unit of the third embodiment.

The image encoding unit 20-3 includes a DC level shift unit 21, a band division unit 22, a Significant Bit (SB)/Zero Bit Plane (ZBP) detection unit 23, an entropy-encoding unit 24, a distortion characteristic estimation unit 25, a truncation unit 26 and a packing unit 27, similar to the first embodiment. In addition, a ZBP orthogonal transform unit 28 is provided in the image encoding unit 20-3.

Similar to the first embodiment, the DC level shift unit 21 performs level shift of a DC component of image data, in order to efficiently perform frequency band division by the band division unit 22. The DC level shift unit 21, for example, subtracts a DC value from input image data DVa of a block unit of M×N pixels and outputs the subtracted value to the band division unit 22. The band division unit 22 performs frequency band division of image data DVb output from the DC level shift unit 21. The band division unit 22 performs frequency band division again after rearranging a spatial position with respect to coefficient data of a low-band component obtained by frequency band division and generates coefficient data of each of a plurality of frequency bands from image data within a block of M×N pixels. The band division unit 22 performs frequency band division using, for example, Modified Discrete Wavelet Transform (MDWT). The band division unit 22 outputs an absolute value CEa of MDWT coefficient data obtained by performing MDWT to the SB/ZBP detection unit 23, the entropy-encoding unit 24 and the distortion characteristic estimation unit 25. In addition, the band division unit 22 outputs a code CEs of the MDWT coefficient data obtained by performing MDWT to the truncation unit 26. The SB/ZBP detection unit 23 detects a Significant Bit (SB) and a Zero Bit Plane (ZBP) from the absolute value of the MDWT coefficient data. The SB/ZBP detection unit 23 outputs an SB detection result DTsb to the entropy-encoding unit 24 and the distortion characteristic estimation unit 25. In addition, the SB/ZBP detection unit 23 supplies a ZBP detection result DTzbp to the distortion characteristic estimation unit 25, the truncation unit 26 and the ZBP orthogonal transform unit 28.

The ZBP orthogonal transform unit 28 provided in the third embodiment performs orthogonal transform of the ZBP detection result DTzbp. The ZBP orthogonal transform unit 28 performs orthogonal transform using the ZBP detection result DTzbp as a numerical string and supplies a ZBP orthogonal transform result DTtzbp which is a numerical string after the transform to the entropy-encoding unit 24.

The entropy-encoding unit 24 entropy-encodes a bit plane of the absolute value CEa of the MDWT coefficient data, a ZBP and a Truncation Point (TP), using the absolute value CEa of the MDWT coefficient data, the SB detection result DTsb, and the ZBP orthogonal transform result DTtzbp. The entropy-encoding unit 24 outputs a bit stream BSa obtained by performing entropy-encoding to the truncation unit 26. In addition, the entropy-encoding unit 24 outputs a bit stream length DTbs obtained by performing entropy-encoding to the distortion characteristic estimation unit 25 and the truncation unit 26. In addition, the entropy-encoding unit 24 outputs a mode flag MF obtained by performing entropy-encoding to the packing unit 27.

Similar to the first embodiment, the distortion characteristic estimation unit 25 performs distortion characteristic estimation based on the absolute value CEa of the MDWT coefficient data, the SB detection result DTsb, the ZBP detection result DTzbp and the bit stream length DTbs and outputs a distortion characteristic estimation result Erd to the truncation unit 26. The truncation unit 26 decides a bit stream and a code of encoding symmetry such that a code amount is within a predetermined target code amount using the bit stream BSa, the bit stream length DTbs, the ZBP detection result DTzbp, the code CEs and the distortion characteristic estimation result Erd. The packing unit 27 transforms the truncated bit stream BSb and the mode flag MF into a predetermined format and prepares encoded data Dpd which is decodable by the image decoding unit 30-3. The packing unit 27 outputs the prepared encoded data Dpd from the image encoding unit 20-3.

[4-2. Operation of Image Encoding Unit of Third Embodiment]

Figure 35:
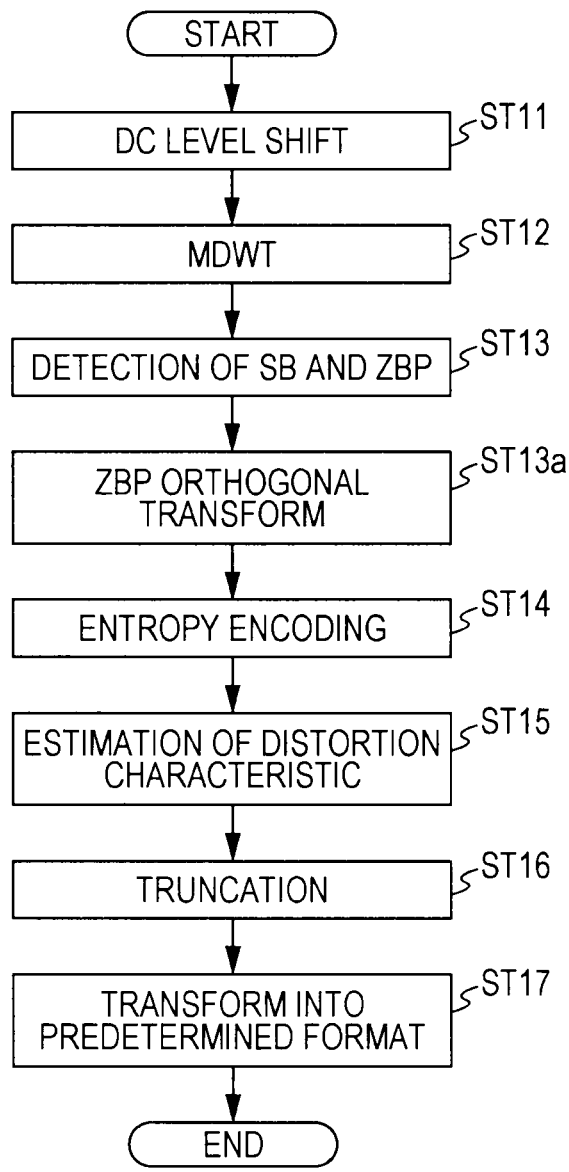
FIG. 35 is a flowchart illustrating an operation of an image decoding unit according to a second embodiment.

FIG. 35 is a flowchart illustrating an operation of an image encoding unit according to the third embodiment. In FIG. 35, the processes corresponding to the image encoding unit of the first embodiment are denoted by the same reference numerals.

In step ST11, the image encoding unit 20-3 performs DC level shift. The image encoding unit 20-3 performs DC level shift with respect to the input image data DVa by the DC level shift unit 21 and progresses to step ST12.

In step ST12, the image encoding unit 20-3 performs MDWT. The image encoding unit 20-3 performs MDWT with respect to the DC level shifted image data DVb by the band division unit 22, obtains the absolute value CEa of the MDWT coefficient data and the code CEs, and progresses to step ST13.

In step ST13, the image encoding unit 20-3 performs SB and ZBP detection. The image encoding unit 20-3 detects the SB and the ZBP from the absolute value CEa of the MDWT coefficient data by the SB/ZBP detection unit 23 and progresses to step ST13a.

In step ST13a, the image encoding unit 20-3 performs orthogonal transform of the ZBP detection result. The image encoding unit 20-3 performs orthogonal transform of the ZBP detection result DTzbp obtained by the SB/ZBP detection unit 23, calculates the ZBP orthogonal transform result DTtzbp, and progresses to step ST14.

In step ST14, the image encoding unit 20-3 performs entropy-encoding. The image encoding unit 20-3 performs entropy-encoding with respect to the bit plane of the absolute value CEa of the MDWT coefficient data, the SB detection result DTsb and the ZBP orthogonal transform result DTtzbp by the entropy-encoding unit 24, obtains the bit stream BSa, the bit stream length DTbs and the mode flag MF, and progresses to step ST15.

In step ST15, the image encoding unit 20-3 performs distortion characteristic estimation. The image encoding unit 20-3 performs distortion characteristic estimation based on the absolute value CEa of the MDWT coefficient data, the SB detection result DTsb, the ZBP detection result DTzbp and the bit stream length DTbs by the distortion characteristic estimation unit 25 and progresses to step ST16.

In step ST16, the image encoding unit 20-3 performs truncation. The image encoding unit 20-3 performs truncation as necessary, based on the bit stream BSa, the bit stream length DTbs, the ZBP detection result DTzbp, the code CEs and the distortion characteristic estimation result Erd, by the truncation unit 26. The image encoding unit 20-3 performs truncation of the bit stream and the code when the bit stream length is not fitted into a target code length and progresses to step ST17 when the code length of the bit stream BSb is equal to or less than the target code length.

In step ST17, the image encoding unit 20-3 performs transform into a predetermined format. The image encoding unit 20-3 transforms additional information including the mode flag MF and the truncated bit stream BSb into a predetermined format using the packing unit 27, generates the encoded data Dpd, and finishes an encoding process.

[4-3. Operation of Each Unit of Image Encoding Unit]

Next, the operation of each unit of the image encoding unit of the third embodiment will be described. The band division unit 22 rearranges the spatial position with respect to the coefficient data of the low-band component, in addition to Discrete Wavelet Transform (DWT), and generates the MDWT coefficient data, as described in the above [2-3-1. Operation of Band Division Unit].

The SB/ZBP detection unit 23 obtains and sets the index IDXsb of the SB for each piece of the MDWT coefficient data output from the band division unit 22 to the SB detection result DTsb, as described in the above [2-3-2. Operation of SB/ZBP Detection Unit]. For each sub-block including J pieces of coefficient data, the index IDXzbp of the ZBP is obtained and set to the ZBP detection result DTzbp.

The ZBP orthogonal transform unit 28 performs orthogonal transform of the ZBP detection result DTzbp. The ZBP orthogonal transform unit 28 performs orthogonal transform using the ZBP detection result DTzbp as a numerical string and calculates the ZBP orthogonal transform result DTtzbp. The ZBP orthogonal transform unit 28 uses, for example, Haar transform as orthogonal transform.

Equations (7) and (8) show Haar transform, "X(n)" denotes a numerical string of an input, "Y(n)" denotes a numerical string of an output, "N" denotes the number of elements of a numerical string, and "n" denotes an index of a numerical string. In addition, "n" is "0n<N/2".

$$Y(n+N/2)=X(2n+1)-X(2n) \qquad (7)$$

$$Y(n)=X(2n)+(Y(n+N/2)\gg 1) \qquad (8)$$

Figure 36A:
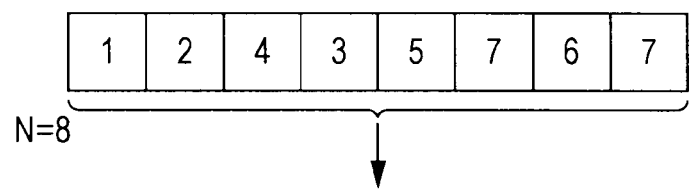
FIGS. 36A to 36D are diagrams showing a transform process of Haar transform.
Figure 36B:
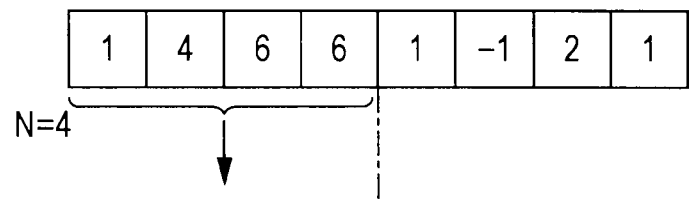

FIGS. 36A to 36D show a transform process of Haar transform. FIG. 36A shows the case where, when the ZBP detection result DTzbp is a numerical string, the numerical string is "1, 2, 4, 3, 5, 7, 6, 7". The ZBP orthogonal transform unit 28 performs Haar transform as "N=8" from the numerical string including eight digits. If the operation of Equation (7) is performed, the fifth to eighth values "1, −1, 2, 1" from the left side of FIG. 36B are calculated. If the operation of Equation (8) is performed using the values calculated using Equation (7) and the value of FIG. 36A, the first to fourth values "1, 4, 6, 6" from the left side of FIG. 36B are calculated. In Equation (8), (Y(n+N/2)≫1) is a process of shifting the data of "Y(n+N/2)" to the right by 1 bit to halve the data.

Figure 36C:
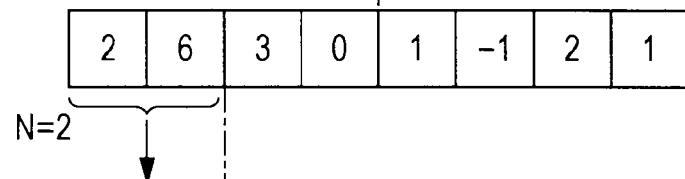

Next, using "N=4", the operations of Equations (7) and (8) are performed with respect to a numerical string shown in FIG. 36B. If the operation of Equation (7) is performed, the third to fourth values "3, 3" from the left side of FIG. 36C are calculated. If the operation of Equation (8) is performed using the values calculated using Equation (7) and the value of FIG. 36B, the first and second values "2, 6" from the left side of FIG. 36C are calculated.

Figure 36D:
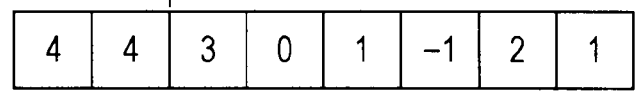

Next, using "N=2", the operations of Equations (7) and (8) are performed with respect to a numerical string shown in FIG. 36C. If the operation of Equation (7) is performed, the second value "4" from the left side of FIG. 36D is calculated. If the operation of Equation (8) is performed using the value calculated using Equation (7) and the value of FIG. 36C, the left-end value "4" of FIG. 36D is calculated. Accordingly, if Haar transform is performed with respect to the numerical string "1, 2, 4, 3, 5, 7, 6, 7", the transform result becomes "4, 4, 3, 0, 1, −1, 2, 1".

In this way, the ZBP orthogonal transform unit 28 performs orthogonal transform of the numerical string representing the ZBP detection result DTzbp and generates the ZBP orthogonal transform result DTtzbp in which a numerical generation distribution is biased.

The entropy-encoding unit 24 entropy-encodes three types of the index IDXtzbp representing the ZBP orthogonal transform result DTtzbp, the index IDXtp of the TP, and the bit plane, using the ZBP orthogonal transform result DTtzbp, instead of the ZBP detection result DTzbp in the description of [2-3-3. Operation of Entropy-encoding Unit].

FIG. 37 shows a relationship between ZBP orthogonal transform result DTtzbp and the index IDXtzbp. A numerical string representing the ZBP orthogonal transform result DTtzbp becomes several values of "0 to 9" when the index IDXtzbp is set as shown in FIG. 10. In addition, if the numerical string representing the ZBP orthogonal transform result DTtzbp becomes several values of "0 to 9", the numerical string of the ZBP orthogonal transform result DTtzbp becomes a numerical value in a range of "−9 to 9". Accordingly, the entropy-encoding unit 24 sets the index IDXtzbp corresponding to the orthogonal transform value of the ZBP orthogonal transform result DTtzbp.

The entropy-encoding unit 24 replaces the symbol with the index IDXtzbp for each index using a transform table. The transform table uses, for example, a Huffman table prepared based on statistical data. If the orthogonal transform of the ZBP detection result DTabp is performed, as described above, a probability that each index of IDXtzbp is generated may be biased. Accordingly, if entropy-encoding is performed using the ZBP orthogonal transform result DTtzbp in which a numerical value generation distribution is biased, a code amount may be reduced compared with the case where entropy-encoding is performed using the ZBP detection result DTzbp. In detail, using the transform table shown in FIG. 38, a symbol corresponding to a combination of the index IDXtzbp of the ZBP and the context is selected as the encoding result. The transform table shown in FIG. 38 uses the Huffman table or the like, which is prepared based on statistical data.

In the case of ZBP orthogonal transform using Haar transform, a band (sub-band) of Haar transform to which each index belongs is used as the context. This is because, as a Haar transform property, a statistical property of an appearance probability of an index is different for each sub-band.

In addition, the transform table is not limited to the case of using one transform table and a transform table used for encoding may be selected from among a plurality of transform tables. For example, two types of tables including a ZBP_Easy_table applied to the index IDXzbp (encoding is simple) of the ZBP relatively in line with statistical data and a ZBP_Hard_table applied to that (encoding is different) deviated from statistical data are used.

In the case of performing the entropy-encoding method of the index IDXtzbp using the two types of transform tables, similar to the case of FIG. 12, encoding using the ZBP_Hard_table and encoding using the ZBP_Easy_table are performed and a bit stream length of a block unit of M×N pixels is obtained. In addition, the obtained bit stream length is compared, and an encoding result having a short bit stream length is selected and output. Using an average value of the index IDXtzbp instead of the average value of the index IDXzbp of the case of FIG. 13, according to the comparison result of the average value and the threshold, an encoding result using any one of the ZBP_Hard_table or the ZBP_Easy_table may be output.

The entropy-encoding unit 24 performs entropy-encoding of the index IDXtp of the TP or encoding of the bit plane as described in the above [2-3-3. Operation of Entropy-encoding Unit] and generates the bit stream. In the entropy-encoding of the bit plane, unlike the encoding of the ZBP orthogonal transform result or the TP, the coefficient bit (for example, the value of "1, 0") of the bit plane is encoded. As the context of the transform table, the index IDXbp of the bit plane, the sub-band to which the bit plane belongs, the SB_flag or the like is used.

The entropy-encoding unit 24 records the respective bit stream lengths when the bit streams are generated, in the entropy-encoding of the ZBP orthogonal transform result, the TP and the bit plane. These are necessary in the distortion characteristic estimation unit 25 of a subsequent stage. In particular, the bit stream lengths of the TP and the bit plane are necessary to be recorded in each bit plane and each sub-block, in order to perform truncation.

The distortion characteristic estimation unit 25 estimates the distortion characteristic representing a relationship between a code amount and distortion, in order to determine which bit plane is truncated by the truncation unit 26, as described in the above [2-3-4. Operation of Distortion Characteristic Estimation Unit].

The truncation unit 26 performs sorting of the bit plane for obtaining optimal image quality within the target code length based on the distortion characteristic estimation result Erd output from the distortion characteristic estimation unit 25, as described in the above [2-3-5. Operation of Truncation Unit]. The packing unit 27 transforms the mode flag MF and the bit stream (ZBP, TP, bit plane, code) BSb after truncation into a predetermined format and generates encoded data Dpd which is decodable by the image decoding unit 30-3, as described in the above [2-3-6. Operation of Packing Unit].

[4-4. Configuration of Image Decoding Unit of Third Embodiment]

Figure 39:
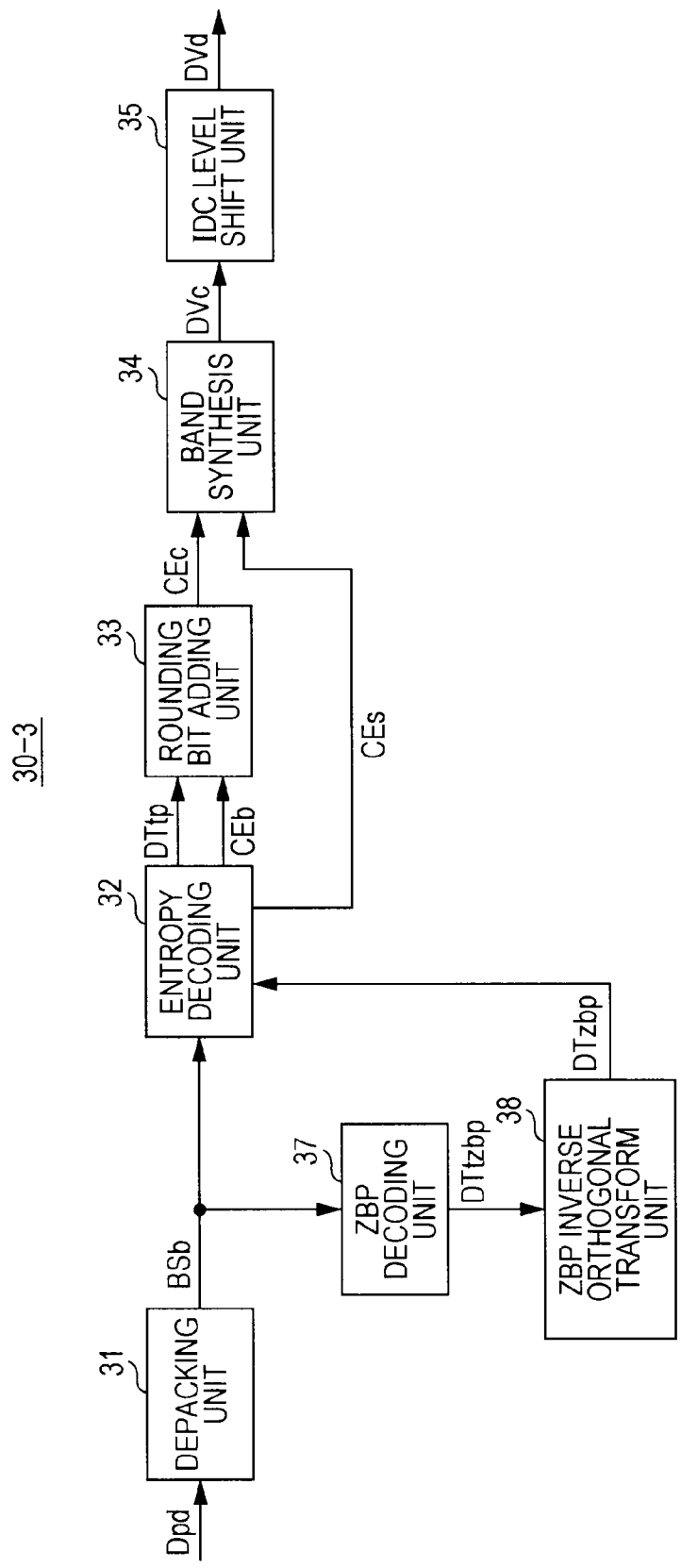
FIG. 39 is a diagram showing the configuration of an image decoding unit according to a third embodiment.

FIG. 39 shows the configuration of an image decoding unit of the third embodiment. The image decoding unit 30-3 includes a depacking unit 31, an entropy decoding unit 32, a rounding bit adding unit 33, a band synthesis unit 34, an IDC level shift unit 35, and the like, similar to the first embodiment. In the image decoding unit 30-3, a ZBP decoding unit 37 and a ZBP inverse orthogonal transform unit 38 are provided.

The depacking unit 31 receives the encoded data Dpd having the predetermined format, which is generated by the image encoding unit 20-3, performs analysis, and acquires additional information necessary for decoding the bit stream by the entropy decoding unit 32. The depacking unit 31 decouples, for example, the bit stream and the information (including the mode flag) necessary for decoding the bit stream from the encoded data having the format shown in FIG. 23. In addition, if the encoded data of the plurality of component signals is collected as one piece of encoded data, the depacking unit 31 performs such decoupling and outputs the decodable bit stream BSb to the entropy decoding unit 32 and the ZBP decoding unit 37 along with the additional information necessary for decoding of the bit stream.

The ZBP decoding unit 37 performs decoding of the bit stream using the additional information (for example, a flag representing a transform table upon encoding) necessary for the decoding of the ZBP. The ZBP decoding unit 37 performs entropy decoding of the bit stream using the same transform table as during encoding and generates the index IDXtzbp. In addition, the ZBP decoding unit 37 replaces the ZBP orthogonal transform result DTtzbp with the index IDXtzbp according to the same rule as during encoding and outputs the replaced result to the ZBP inverse orthogonal transform unit 38.

The ZBP inverse orthogonal transform unit 38 performs inverse orthogonal transform of the ZBP orthogonal transform result DTtzbp supplied from the ZBP decoding unit 37, and generates and outputs the ZBP detection result DTzbp to the entropy decoding unit 32.

The entropy decoding unit 32 performs entropy decoding of the bit stream BSb output from the depacking unit 31, obtains the index IDXtp of the TP, and performs decoding of the absolute value of the MDWT coefficient data using the index IDXtp and the ZBP detection result DTzbp. The entropy decoding unit 32 outputs the decoded absolute value CEb of the MDWT coefficient data and the index IDXtp of the TP obtained by performing entropy decoding of the bit stream BSb to the rounding bit adding unit 33. The entropy decoding unit 32 outputs the code CEs to the band synthesis unit 34.

The rounding bit adding unit 33 estimates the bit stream of the bit plane truncated by the image encoding unit 20-3 and performs restoration of the absolute value of the MDWT coefficient data, based on the absolute value CEb of the MDWT coefficient data and the index IDXtp of the TP. The rounding bit adding unit 33 outputs the restored absolute value CEc of the MDWT coefficient data to the band synthesis unit 34.

The band synthesis unit 34 performs Inverse Modified Discrete Transform using the restored absolute value CEc of the MDWT coefficient data and the code CEs. The Inverse Modified Discrete Transform is a process of returning the coefficient data obtained by the band division unit 22 of the image encoding unit 20-3 to the image data before the transform. The band synthesis unit 34 outputs encoded DC level shift data DVc obtained by Inverse Modified Discrete Transform to the IDC level shift unit 35.

The IDC level shift unit 35 adds a DC value to the encoded DC level shift data DVc and outputs image data DVd of a block unit to the outside of the image decoding unit 30-3. The DC value is equal to the DC value used in the DC level shift unit 21 of the image encoding unit 20-3.

[4-5. Operation of Image Decoding Unit of Third Embodiment]

Figure 40:
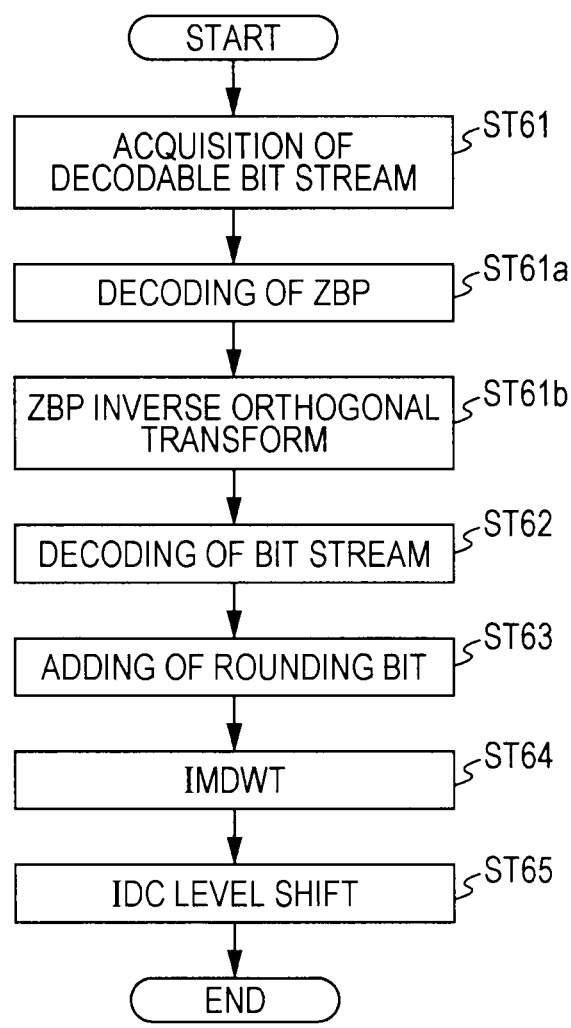
FIG. 40 is a flowchart illustrating an operation of an image decoding unit according to a third embodiment.

Next, the operation of the image decoding unit of the third embodiment will be described using the flowchart of FIG. 40. In FIG. 40, the processes corresponding to the image decoding unit of the first embodiment are denoted by the same reference numerals.

In step ST61, the image decoding unit 30-3 performs acquisition of the decodable bit stream. The image decoding unit 30-3 analyzes the encoded data having the predetermined format using the depacking unit 31, acquires the decodable bit stream from the encoded data, and progresses to step ST61*a*.

In step ST61*a*, the image decoding unit 30-3 performs ZBP decoding. The image decoding unit 30-3 performs ZBP decoding using the bit stream obtained by the depacking unit 31, acquires the ZBP orthogonal transform result DTtzbp, and progresses to step ST61*b*.

In step ST61*b*, the image decoding unit 30-3 performs ZBP inverse orthogonal transform. The image decoding unit 30-3 performs inverse orthogonal transform of the ZBP orthogonal transform result DTtzbp, generates the ZBP detection result DTzbp, and progresses to step ST62.

In step ST62, the image decoding unit 30-3 performs decoding of the bit stream. The image decoding unit 30-3 decodes the index IDXtp representing the TP and then decodes the absolute value of the MDWT coefficient data using the index IDXtp and the ZBP detection result DTzbp generated in step ST61*b* in the entropy-encoding unit. In addition, the image decoding unit 30-3 performs decoding of the code in the entropy decoding unit 32 and progresses to step ST63.

In step ST63, the image decoding unit 30-3 performs addition of a rounding bit. The image decoding unit 30-3 estimates and sets the bit stream of the bit plane truncated by the image encoding unit 20-3 as the rounding bit in the rounding bit adding unit 33. In addition, the image decoding unit 30-3 adds the estimated rounding bit to the decoded absolute value of the MDWT coefficient data, performs restoration of the absolute value of the MDWT coefficient data in the rounding bit adding unit 33, and progresses to step ST64.

In step ST64, the image decoding unit 30-3 performs Inverse Modified Discrete Wavelet Transform (IMDWT). The image decoding unit 30-3 performs IMDWT using the restored absolute value of the MDWT coefficient data and the decoded code in the band synthesis unit 34, obtains a decoded DC level shift signal, and progresses to step ST65.

In step ST65, the image decoding unit 30-3 performs IDC level shift. The image decoding unit 30-3 adds the DC value to the decoded DC level shift signal in the IDC level shift unit 35, obtains decoded image data, and finishes the process.

[4-6. Operation of Each Unit of Image Decoding Unit of Third Embodiment]

The entropy decoding unit 32 receives the bit stream supplied from the depacking unit 31 and the additional information (including the mode flag representing the transform table used for encoding of the bit stream) necessary for decoding as an input, as described in the above [2-6-1. Operation of Entropy Decoding Unit].

The ZBP decoding unit 37 performs decoding of the bit stream using the additional information (for example, the flag representing the transform table upon encoding) necessary for decoding of the ZBP. The ZBP decoding unit 37 performs entropy decoding of the bit stream using the same transform table as upon encoding and generates the index IDXtzbp. In addition, the ZBP decoding unit 37 replaces the ZBP orthogonal transform result DTtzbp with the index IDXtzbp according to the same rule as upon encoding and outputs the replaced result DTtzbp to the ZBP inverse orthogonal transform unit 38.

The ZBP decoding unit 37 determines which of the ZBP_Hard_table and the ZBP_Easy_table is used for encoding of the index IDXtzbp, performs decoding using the determined table, and acquires the index IDXtzbp. The ZBP decoding unit 37 transforms the acquired index IDXtzbp into the numerical value of the ZBP orthogonal transform result DTtzbp based on the table shown in FIG. 37.

The ZBP inverse orthogonal transform unit 38 performs inverse orthogonal transform of the ZBP orthogonal transform result DTtzbp supplied from the ZBP decoding unit 37, and generates and outputs the ZBP detection result DTzbp to the entropy decoding unit 32. The ZBP inverse orthogonal transform unit 38 performs inverse orthogonal transform corresponding to orthogonal transform performed by the ZBP orthogonal transform unit 28 of the image encoding unit 20-3.

For example, if Haar transform is performed by the ZBP orthogonal transform unit 28, the ZBP inverse orthogonal transform unit 38 performs inverse Haar transform.

Equations (9) and (10) show inverse Haar transform, "Y(n)" denotes a numerical string subjected to orthogonal transform (before inverse orthogonal transform), "X(n)" denotes a numerical string of before orthogonal transform (after inverse orthogonal transform), "N" denotes the number of elements of a numerical string, and "n" denotes an index of a numerical string. In addition, "n" is "0n<N/2".

$$X(2n)=Y(n)-(Y(n+N/2)>>1) \quad (9)$$

$$X(2n+1)=X(2n)+Y(n+N/2) \quad (10)$$

FIGS. 41A to 41D show a transform process of inverse Haar transform. FIG. 41A shows the case where, when the ZBP orthogonal transform result DTtzbp is a numerical string "4, 4, 3, 0, 1, −1, 2, 1". The ZBP inverse orthogonal transform unit 38 performs the operations of Equations (9) and (10) as "N=2". If the operation of Equation (9) is performed, the left-end value "2" of FIG. 41B is calculated. In Equation (9), (Y(n+N/2)>>1) is a process of shifting the data of "Y(n+N/2)" to the right by 1 bit to halve the data.

Next, if the operation of Equation (10) is performed using the value calculated using Equation (9) and the value of FIG. 41A, a second value "6" from the left side of FIG. 41B is calculated.

Next, using "N=4", the operations of Equations (9) and (10) are performed with respect to a numerical string shown in FIG. 41B. If the operation of Equation (9) is performed, the first and second values "1, 4" from the left side of FIG. 41C are calculated. In addition, if the operation of Equation (10) is performed using the value calculated using Equation (9) and the value of FIG. 41B, the third and fourth values "6, 6" from the left side of FIG. 41C are calculated.

Next, using "N=8", the operations of Equations (9) and (10) are performed with respect to a numerical string shown in FIG. 41C. If the operation of Equation (9) is performed, the first to fourth values "1, 2, 4, 3" from the left side of FIG. 41D are calculated. If the operation of Equation (10) is performed using the value calculated using Equation (9) and the value of FIG. 41C, the fifth to eighth values "5, 7, 6, 7" from the left side of FIG. 41D are calculated. Accordingly, if inverse Haar transform is performed with respect to the numerical string "4, 4, 3, 0, 1, −1, 2, 1", the transform result becomes "1, 2, 4, 3, 5, 7, 6, 7" and becomes equal to FIG. 36A.

The ZBP inverse orthogonal transform unit 38 performs inverse orthogonal transform of the numerical string representing the ZBP orthogonal transform result DTtzbp and reproduces the ZBP detection result DTzbp before orthogonal transform.

The entropy decoding unit 32 decodes the index IDXtp of the TP. The index IDXtp of the TP is encoded using, for example, one or a plurality of Huffman tables, as described in the above-described operation of the entropy-encoding unit 24 of the image encoding unit 20-1. Accordingly, the entropy decoding unit 32 determines, by the mode flag, which of the transform tables is used for the encoding. The entropy decoding unit 32 performs decoding using the TP_Hard_table when it is determined that encoding is performed using the TP_Hard_table and performs decoding using the TPEasytable when it is determined that encoding is performed using the TP_Easy_table.

The entropy decoding unit 32 may determine which part of the bit plane is encoded from the ZBP detection result DTzbp and the result of decoding the index IDXtp of the TP. From the point in which the encoded range becomes apparent, it is determined to which sub-block of which bit plane the data obtained by decoding the bit stream belongs.

The entropy decoding unit 32 performs decoding of the bit stream representing the absolute value of the MDWT coefficient data. The entropy decoding unit 32 performs decoding using the Coef_Hard_table when it is determined that encoding is performed using the Coef_Hard_table and performs decoding using the Coef_Easy_table when it is determined that encoding is performed using the Coef_Easy_table. The entropy decoding unit 32 determines, by the mode flag, which of the transform tables is used for the encoding of the additional information.

The entropy decoding unit 32 performs decoding using the transform table, acquires the data representing the absolute value of the MDWT coefficient data, and finishes the decoding operation.

The rounding bit adding unit 33 estimates a lower-order bit truncated by the image encoding unit 20-3 and restores the absolute value of the MDWT coefficient data. The rounding bit adding unit 33 determines the position of the lower-order bit truncated by the image encoding unit 20-3 based on the index IDXtp of the TP and estimates the data of the determined position. As the estimation method, as described above, the estimated data is acquired by referring to a table prepared based on statistics in advance, is added to the data representing the absolute value of the coefficient data, and is output to the band synthesis unit 34.

The band synthesis unit 34 performs Inverse Modified Discrete Wavelet Transform (IMDWT) which is the inverse modified discrete transform of the MDWT performed by the image encoding unit 20-3. As described in the image encoding unit 20-3, the MDWT is fundamentally equal to the DWT, but replacement of the spatial position of the low-band signal is performed whenever band division is performed in order to improve band division precision of a signal end. Accordingly, the band synthesis unit 34 returns the spatial position of the low-band signal in the input MDWT coefficient data to an original position by the inverse operation of the operation performed during encoding. Thereafter, similar to the IDWT, deinterleaving, target period extension and two-stage lifting operation are performed to perform band synthesis. In addition, in the case where band synthesis is repeated, an operation for returning the low-band signal to the original spatial position is first performed. The band synthesis unit 34 performs such a process and generates the decoded DC level shift signal.

In this way, when encoding or decoding of the image data is performed by the image encoding unit 20-3 and the image decoding unit 30-3, since the spatial position is rearranged with respect to the coefficient data of the low-band component obtained by frequency band division, frequency band division is repeated with respect to the coefficient data of the low-band component. Even when the coefficient data of each of the plurality of frequency bands is generated, for example, since the position of the coefficient data of the low-band component generated using the extended image data is not fixed, the influence of the deterioration of band division precision is not repeatedly applied due to the use of the extended image data. Accordingly, even when image encoding is performed in block units, a decoded image with low block distortion is obtained.

The coefficient data is divided as a sub-block for each predetermined number and a variation in the distortion amount of the image when the bit plane of the coefficient data is truncated for each sub-block is estimated. With respect to the estimation result, the sub-block located on the end of the block is weighted so as to be not easily truncated compared with the sub-block of another position. Based on the estimation result after weighting, the truncation position in which image distortion is low and the code amount is within the target code amount is detected and the truncation of the coefficient data or the like is performed. Accordingly, since the risk of the coefficient data of the end of the block being truncated can be suppressed, it is possible to lessen distortion in the boundary between blocks.

Since the orthogonal transform of the ZBP detection result DTzbp is performed such that a numerical value generation frequency is biased, it is possible to further reduce the amount of generated code by performing the entropy-encoding process according to bias.

5. Fourth Embodiment

[5-1. Configuration of Image Encoding Unit of Fourth Embodiment]

Figure 42:
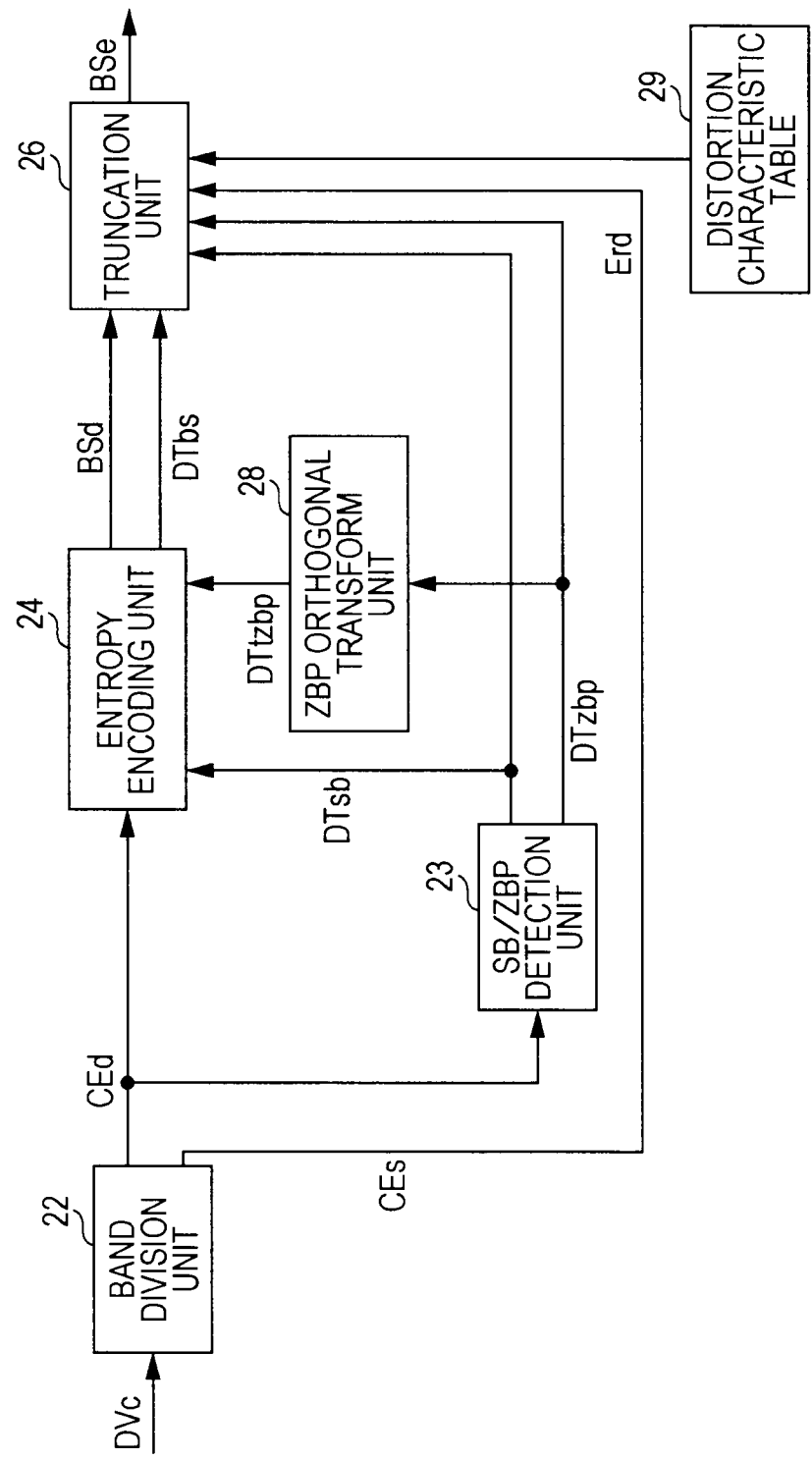
FIG. 42 is a diagram showing the configuration of an image encoding unit according to a fourth embodiment.

FIG. 42 shows the configuration obtained by simplifying the image encoding unit of the third embodiment as a fourth embodiment.

The image encoding unit 20-4 has the configuration in which the DC level shift unit 21, the distortion characteristic estimation unit 25 and the packing unit 27 are omitted from the image encoding unit 20-3 shown in FIG. 34.

In this case, the band division unit 22 performs MDWT with respect to the input image data, instead of the DC level shifted signal. In addition, if the distortion characteristic estimation unit 25 which becomes a criterion for performing truncation is omitted, for example, the encoding distortion $EC\Delta D_i^{(p)}$ or the slope $(EC\Delta D_i^{(p)}/\Delta Ri(p))$ is calculated by the distortion characteristic estimation unit 25 in advance, and is stored in a distortion characteristic table 29. The distortion characteristic table is input to the truncation unit 26 and the truncation unit 26 performs truncation based on the distortion characteristic table. In addition, in the entropy-encoding unit 24, if the number of encoding tables used in the ZBP orthogonal transform result, the TP and the bit plane is one and there is no information added to the truncated bit stream, the truncated bit stream may be output from the image encoding unit 20-4 as encoded data. In this case, the packing unit 27 may also be omitted.

[5-2. Configuration of Image Decoding Unit of Fourth Embodiment]

Figure 43:
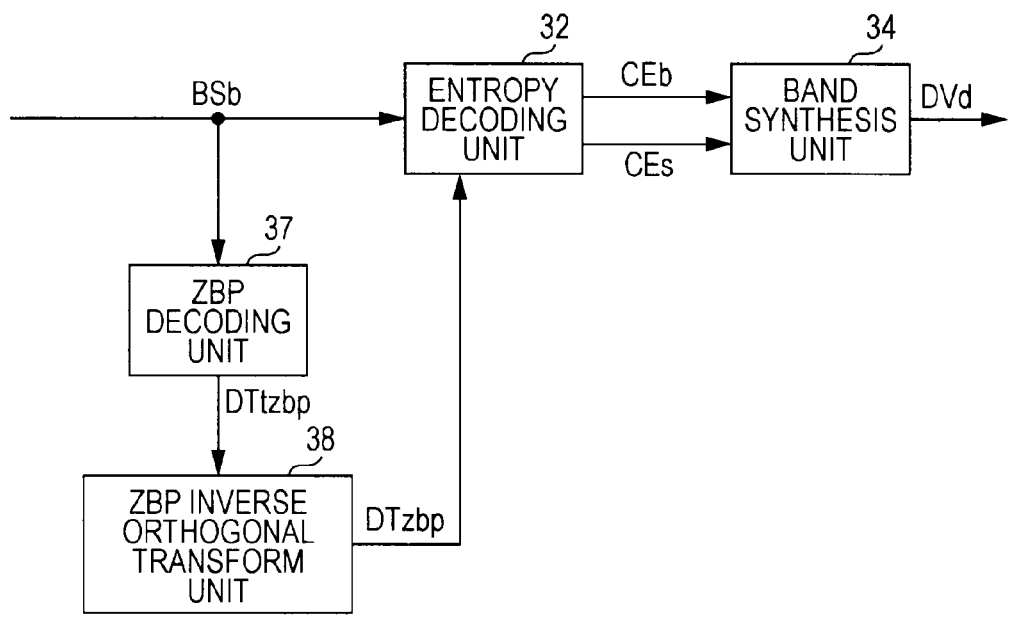
FIG. 43 is a diagram showing the configuration of an image decoding unit according to a fourth embodiment.

FIG. 43 shows the configuration obtained by simplifying the image decoding unit of the third embodiment as a fourth embodiment.

The image decoding unit 30-4 has the configuration in which the depacking unit 31, the rounding bit adding unit 33 and the IDC level shift unit 35 are omitted from the image decoding unit 30-3 shown in FIG. 39.

If the encoded data generated by the image encoding unit 20-4 shown in FIG. 42 includes only the bit stream and does not include additional information, the depacking unit 31 may not be provided in the image decoding unit 30-4. In addition, since the rounding bit adding unit 33 is not a component necessary for decoding and is provided for the purpose of improving the image quality of the decoded signal, the rounding bit adding unit may be omitted. In the case where DC level shift is not performed in the image encoding unit 20-4, the IDC level shift unit 35 may not be provided. Accordingly, if the image decoding unit 30-4 of the configuration shown in FIG. 43 is used, the bit stream output from the image encoding unit 20-4 may be decoded.

6. Case where Encoding and Decoding are Performed by Computer

The above-described series of processes may be executed by hardware or software. If the series of processes is executed by software, a computer in which a program configuring the software is assembled in dedicated hardware is used. Alternatively, by installing various types of programs, software is installed from a program recording medium using, for example, a general-purpose personal computer or the like, which is capable of executing various types of functions.

Figure 44:
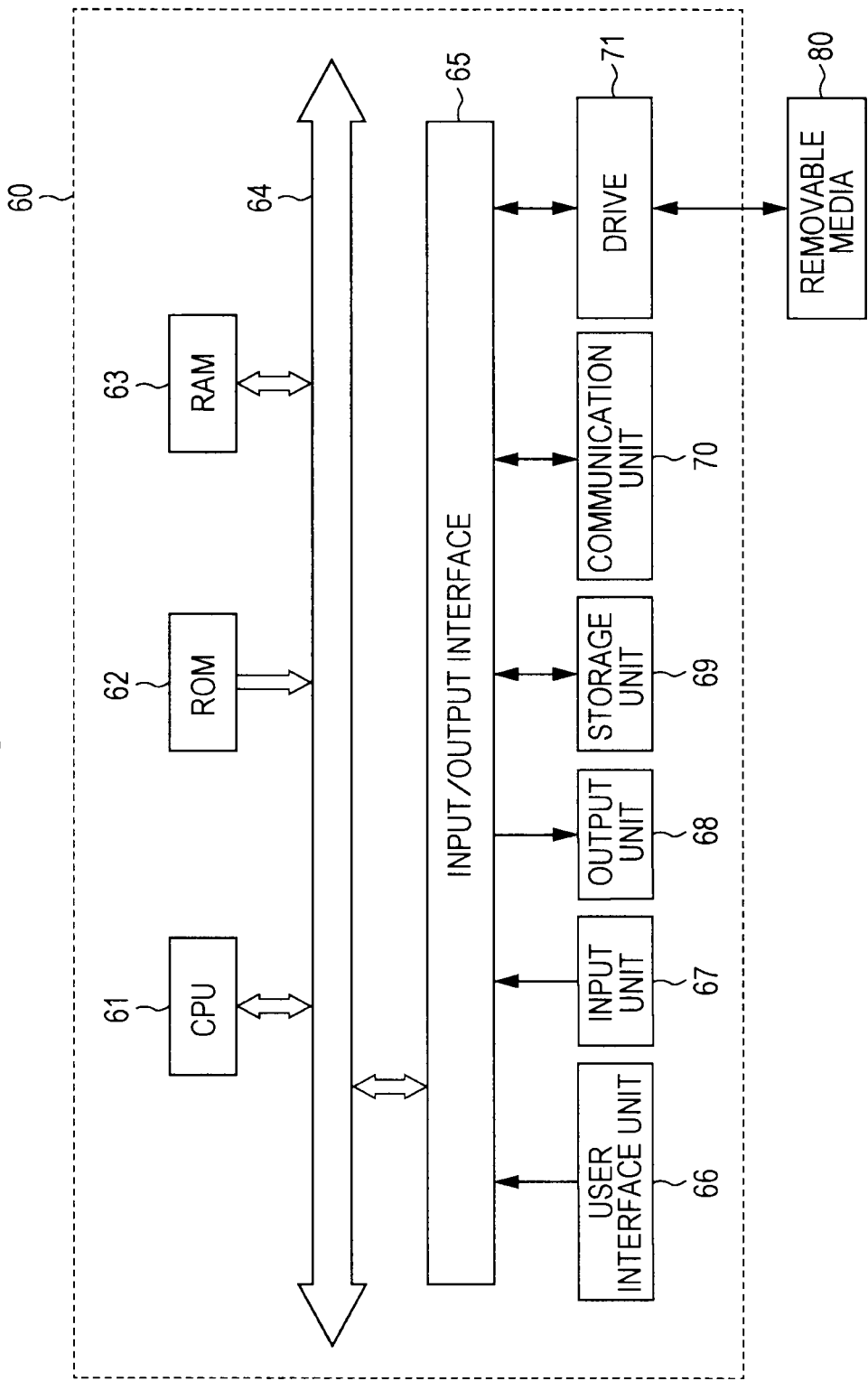
FIG. 44 is a diagram showing the hardware configuration of a computer.

FIG. 44 is a diagram showing the hardware configuration of a computer for executing the above-described series of processes by a program.

In the computer 60, a Central Processing Unit (CPU) 61, a Read Only Memory (ROM) 62 and a Random Access Memory (RAM) 63 are connected to each other by a bus 64.

An input/output interface 65 is connected to the bus 64. A user interface 66 including a keyboard, a mouse and the like, an input unit 67 for inputting image data, an output unit 68 including a display and the like, and a recording unit 69 including a hard disk, non-volatile memory and the like are connected to the input/output interface 65. A communication unit 70 including a network interface and the like and a drive 71 for driving a removable medium 80 such as a magnetic disk, an optical disc, a magneto-optical disc and a semiconductor memory are connected to the input/output interface 65.

In the computer having the above configuration, the CPU 61 loads and executes, for example, the program recorded on the recording unit 69 to the RAM 63 through the input/output interface 65 and the bus 64, thereby performing the above-described series of processes.

The program executed by the computer (CPU 61) is recorded, for example, on the removable medium 80 which is a package medium such as a magnetic disk (including a flexible disk), an optical disc (a Compact Disc-Read Only Memory (CD-ROM), a Digital Versatile Disc (DVD), or the like), a magneto-optical disc, a semiconductor memory or the like, or is provided through a wired or wireless transfer medium such as a local area network, the Internet or a digital satellite broadcast.

The program may be installed in the recording unit 69 through the input/output interface 65 by mounting the removable medium 80 in the drive 71. The program may be received by the communication unit 70 through the wired or wireless transfer medium and installed in the recording unit 69. The program may be installed in the ROM 62 or the recording unit 69 in advance.

The program executed by the computer may be a program for performing a process in time series in the order described in the present specification or a program for performing a process at necessary timings such as upon calling or in parallel.

The embodiments of the invention are not limited to the above-described embodiments and various modifications may be made without departing from the scope of the invention. For example, although the 5×3 lifting configuration is described in the above-described embodiments, a 9×7 lifting configuration or the like may be possible. The scope of the invention is defined by the claims.

The present application contains subject matter related to that disclosed in Japanese Priority Patent Application JP 2010-059117 filed in the Japan Patent Office on Mar. 16, 2010 and Japanese Priority Patent Application JP 2010-247587 filed in the Japan Patent Office on Nov. 4, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image encoding apparatus comprising:
  circuitry configured:
    to perform a first frequency band division to generate coefficient data of each of a plurality of frequency bands from image data of a block unit and, based on the first frequency band division to generate the coefficient data, to perform a second frequency band division of the coefficient data of a low-band component after performing a spatial position rearrangement operation, the spatial position rearrangement operation including rearranging a spatial position with respect to the coefficient data of the low-band component obtained by the first frequency band division without rearrangement of a spatial position with respect to the coefficient data of a high-band component, such that a coefficient data portion at an end of a block unit of the coefficients of the low-band component is rearranged to no longer be at the end of the block unit of the coefficients of the low-band component; and
    to perform encoding of the coefficient data of each of the plurality of frequency bands,
    wherein the coefficient data portion at the end of the block unit of the coefficients of the low-band component is created based on coefficient data of the high-band component associated with an extension operation to a portion of the image data in an end of the block unit of the image data.

2. The image encoding apparatus according to claim 1, wherein the circuitry is configured to extend the portion of the image data in the end of the block unit of the image data to perform the first frequency band division, and moves coefficient data generated by the extended image data.

3. The image encoding apparatus according to claim 2, wherein the circuitry is configured to invert a position of the coefficient data of the low-band component to rearrange the coefficient data generated using the extended image data.

4. The image encoding apparatus according to claim 2, wherein the circuitry is configured to perform a lifting operation and deinterleaving, and generates the coefficient data of each of the plurality of frequency bands.

5. The image encoding apparatus according to claim 1, wherein the circuitry is configured:
to estimate a variation in a distortion amount of an image when a bit plane of the coefficient data is truncated for each sub-block obtained by dividing the coefficient data for each predetermined number,
to detect a truncation position in which image distortion is below an amount and a code amount is within a target code amount based on the estimation result and to perform truncation of the bit plane,
to perform weighting with respect to the estimation result, and
to perform truncation of the bit plane based on the weighted estimation result.

6. The image encoding apparatus according to claim 5, wherein the circuitry is configured to perform weighting with respect to the estimation result such that a sub-block located on an end of the block is not as easily truncated as compared to a sub-block of another position.

7. The image encoding apparatus according to claim 6, wherein the circuitry is configured:
to detect a most significant bit plane of the coefficient data and a zero bit plane of each sub-block, and
encode the detection result and the coefficient data based on one or a plurality of contexts.

8. The image encoding apparatus according to claim 7, wherein the circuitry is configured:
to perform orthogonal transform of a numerical string representing the detected zero bit plane, and
to use a transform result obtained by the zero bit plane orthogonal transform unit instead of the detection result associated with the zero bit plane.

9. An image encoding method comprising:
performing, in a processor, a first frequency band division to generate coefficient data of each of a plurality of frequency bands from image data of a block unit;
performing, in the processor, a second frequency band division of the coefficient data of a low-band component after performing a spatial position rearrangement operation, the spatial position rearrangement operation including rearranging a spatial position with respect to the coefficient data of the low-band component obtained by the first frequency band division, without rearrangement of a spatial position with respect to the coefficient data of a high-band component, such that a coefficient data portion at an end of a block unit of the coefficients of the low-band component is rearranged to no longer be at the end of the block unit of the coefficients of the low-band component; and
performing, in the processor, encoding of the coefficient data of each of the plurality of frequency bands,
wherein the coefficient data portion at the end of the block unit of the coefficients of the low-band component is created based on coefficient data of the high-band component associated with an extension operation to a portion of the image data in an end of the block unit of the image data.

10. A non-transitory computer-readable storage medium storing computer-readable instructions that, when executed by a computer, cause the computer to perform a method comprising:
performing a first frequency band division to generate coefficient data of each of a plurality of frequency bands from image data of a block unit;
based on the first frequency band division to generate the coefficient data, performing a second frequency band division of the coefficient data of a low-band component after performing a spatial position rearrangement operation, the spatial position rearrangement operation including rearranging a spatial position with respect to the coefficient data of the low-band component obtained by the first frequency band division, without rearrangement of a spatial position with respect to the coefficient data of a high-band component, such that a coefficient data portion at an end of a block unit of the coefficients of the low-band component is rearranged to no longer be at the end of the block unit of the coefficients of the low-band component; and
performing encoding of the coefficient data of each of the plurality of frequency bands,
wherein the coefficient data portion at the end of the block unit of the coefficients of the low-band component is created based on coefficient data of the high-band component associated with an extension operation to a portion of the image data in an end of the block unit of the image data.

11. An image encoding apparatus comprising:
processing circuitry configured:
to perform a first frequency band division of image data of a block unit and to generate coefficient data of each of a plurality of frequency bands, and to perform, based on the first frequency band division, a second frequency band division of the coefficient data of a low-band component after performing a spatial position rearrangement operation, the spatial position rearrangement operation including rearranging a spatial position with respect to the coefficient data of the low-band component obtained by the first frequency band division, without rearrangement of a spatial position with respect to the coefficient data of a high-band component, such that a coefficient data portion at an end of a block unit of the coefficients of the low-band component is rearranged to no longer be at the end of the block unit of the coefficients of the low-band component;
to perform encoding of the coefficient data of each of the plurality of frequency bands;
to estimate a variation in a distortion amount of an image when a bit plane of the coefficient data is truncated and to perform weighting based on the estimation result, for each sub-block obtained by dividing the coefficient data for each predetermined number; and
to detect a truncation position in which image distortion is below an amount and a code amount is within a target code amount based on the weighted estimation result, and to perform truncation of the bit plane,
wherein the coefficient data portion at the end of the block unit of the coefficients of the low-band component is created based on coefficient data of the high-band component associated with an extension operation to a portion of the image data in an end of the block unit of the image data.

12. The image encoding apparatus according to claim 10, wherein the circuitry is configured to perform weighting with respect to the estimation result such that a sub-block located on an end of the block is not as easily truncated as compared to a sub-block of another position.

13. An image encoding method comprising:
performing a first frequency band division of image data of a block unit and generating coefficient data of each of a plurality of frequency bands, and performing, based on the first frequency band division, a second frequency band division of the coefficient data of a low-band component after performing a spatial position rearrangement operation, the spatial position rearrangement operation including rearranging a spatial position with respect to the coefficient data of the low-band component obtained by the first frequency band division, without rearrangement of a spatial position with respect to the coefficient data of a high-band component, such that a coefficient data portion at an end of a block unit of the coefficients of the low-band component is rearranged to no longer be at the end of the block unit of the coefficients of the low-band component, using processing circuitry;
performing encoding of the coefficient data of each of the plurality of frequency bands, using the processing circuitry;
estimating a variation in distortion amount of an image when a bit plane of the coefficient data is truncated and performing weighting with respect to the estimation result, for each sub-block obtained by dividing the coefficient data for each predetermined number, using the processing circuitry; and
detecting a truncation position in which image distortion is below an amount and a code amount is within a target code amount based on the weighted estimation result and performing truncation of the bit plane, using the processing circuitry,
wherein the coefficient data portion at the end of the block unit of the coefficients of the low-band component is created based on coefficient data of the high-band component associated with an extension operation to a portion of the image data in an end of the block unit of the image data.

14. A non-transitory computer-readable storage medium storing computer-readable instructions that, when executed by a computer, cause the computer to perform a method comprising:
performing a first frequency band division of image data of a block unit and generating coefficient data of each of a plurality of frequency bands;
performing a second frequency band division of the coefficient data of a low-band component after performing a spatial position rearrangement operation, the spatial position rearrangement operation including rearranging a spatial position with respect to the coefficient data of the low-band component obtained by the first frequency band division, without rearrangement of a spatial position with respect to the coefficient data of a high-band component, such that a coefficient data portion at an end of a block unit of the coefficients of the low-band component is rearranged to no longer be at the end of the block unit of the coefficients of the low-band component;
performing encoding the coefficient data of each of the plurality of frequency bands;
estimating a variation in a distortion amount of an image when a bit plane of the coefficient data is truncated and performing weighting with respect to the estimation result, for each sub-block obtained by dividing the coefficient data for each predetermined number; and
detecting a truncation position in which image distortion is below an amount and a code amount is within a target code amount based on the weighted estimation result and performing truncation of the bit plane,
wherein the coefficient data portion at the end of the block unit of the coefficients of the low-band component is created based on coefficient data of the high-band component associated with an extension operation to a portion of the image data in an end of the block unit of the image data.

15. An image decoding apparatus comprising:
processing circuitry configured:
to decode encoded data in which coefficient data obtained by performing a first frequency band division of image data of a block unit is encoded and by performing a second frequency band division of coefficient data of a low-band component after performing a spatial position rearrangement operation, the spatial position rearrangement operation including rearranging a spatial position with respect to the coefficient data of the low-band component obtained by the first frequency band division, without rearrangement of a spatial position with respect to the coefficient data of a high-band component, such that a coefficient data portion at an end of a block unit of the coefficients of the low-band component is rearranged to no longer be at the end of the block unit of the coefficients of the low-band component; and
to perform frequency band synthesis of the coefficient data of each of a plurality of frequency bands, and to generate image data of a block unit, after returning the coefficient data obtained by the decoding to an order before rearrangement,
wherein the coefficient data portion at the end of the block unit of the coefficients of the low-band component is created based on coefficient data of the high-band component associated with an extension operation to a portion of the image data in an end of the block unit of the image data.

16. An image decoding method comprising:
decoding encoded data in which coefficient data obtained by performing a first frequency band division of image data of a block unit is encoded and by performing a second frequency band division of coefficient data of a low-band component after performing a spatial position rearrangement operation, the spatial position rearrangement operation including rearranging a spatial position with respect to the coefficient data of the low-band component obtained by the first frequency band division, without rearrangement of a spatial position with respect to the coefficient data of a high-band component, such that a coefficient data portion at an end of a block unit of the coefficients of the low-band component is rearranged to no longer be at the end of the block unit of the coefficients of the low-band component, using processing circuitry; and
performing frequency band synthesis of the coefficient data of each of a plurality of frequency bands and generating image data of a block unit, after returning the coefficient data obtained by the decoding to an order before rearrangement, using the processing circuitry,
wherein the coefficient data portion at the end of the block unit of the coefficients of the low-band component is created based on coefficient data of the high-band component associated with an extension operation to a portion of the image data in an end of the block unit of the image data.

17. A non-transitory computer-readable storage medium storing computer-readable instructions that, when executed by a computer, cause the computer to perform a method comprising:

decoding encoded data in which coefficient data obtained by performing a first frequency band division of image data of a block unit and by performing a second frequency band division of coefficient data of a low-band component after performing a spatial position rearrangement operation, the spatial position rearrangement operation including rearranging a spatial position with respect to the coefficient data of the low-band component obtained by the first frequency band division is encoded, without rearrangement of a spatial position with respect to the coefficient data of a high-band component, such that a coefficient data portion at an end of a block unit of the coefficients of the low-band component is rearranged to no longer be at the end of the block unit of the coefficients of the low-band component; and performing frequency band synthesis of the coefficient data of each of a plurality of frequency bands and generating image data of a block unit, after returning the coefficient data obtained by the decoding to an order before rearrangement, wherein the coefficient data portion at the end of the block unit of the coefficients of the low-band component is created based on coefficient data of the high-band component associated with an extension operation to a portion of the image data in an end of the block unit of the image data.

18. The image encoding apparatus according to claim 1, wherein said image data of a block unit is a one-dimensional block, and each of the first and second frequency band divisions is a single-dimension band division.

19. The image encoding apparatus according to claim 1, wherein the rearranging the spatial position with respect to the coefficient data of the low-band component obtained by the first frequency band division includes reversing an order the coefficient data.

20. The image encoding apparatus according to claim 1, wherein said image data of a block unit is a one-dimensional block of eight pixels of less.

* * * * *